United States Patent
Asano

(10) Patent No.: US 12,523,601 B2
(45) Date of Patent: Jan. 13, 2026

(54) GAS DETECTION DEVICE, GAS DETECTION METHOD, AND GAS DETECTION PROGRAM

(71) Applicant: Konica Minolta, Inc., Tokyo (JP)

(72) Inventor: Motohiro Asano, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 429 days.

(21) Appl. No.: 17/915,803

(22) PCT Filed: Mar. 25, 2021

(86) PCT No.: PCT/JP2021/012720
§ 371 (c)(1),
(2) Date: Sep. 29, 2022

(87) PCT Pub. No.: WO2021/205901
PCT Pub. Date: Oct. 14, 2021

(65) Prior Publication Data
US 2023/0194418 A1 Jun. 22, 2023

(30) Foreign Application Priority Data
Apr. 10, 2020 (JP) ................... 2020-071098

(51) Int. Cl.
*G01N 21/3504* (2014.01)
*G06V 10/22* (2022.01)
(Continued)

(52) U.S. Cl.
CPC ....... *G01N 21/3504* (2013.01); *G06V 10/235* (2022.01); *G06V 10/267* (2022.01);
(Continued)

(58) Field of Classification Search
CPC .. G01N 21/3504; G06V 20/52; G06V 10/235; G06V 10/759; G06V 10/267; G06V 10/273; G08B 21/12
See application file for complete search history.

(56) References Cited

U.S. PATENT DOCUMENTS

| 2019/0304506 A1* | 10/2019 | Michaud | ................ H04N 5/272 |
| 2020/0026907 A1* | 1/2020 | Chen | .................... G06V 40/168 |
| 2022/0189279 A1* | 6/2022 | Asano | .................... G06V 10/25 |

FOREIGN PATENT DOCUMENTS

| JP | 11203567 A | * | 7/1999 | ............... H04N 7/18 |
| JP | 2012160972 A | * | 8/2012 | ............... H04N 7/18 |

(Continued)

OTHER PUBLICATIONS

International Search Report (ISR) dated Jun. 1, 2021 filed in PCT/JP2021/012720.

*Primary Examiner* — Vu Le
*Assistant Examiner* — Matthew James Bodnark
(74) *Attorney, Agent, or Firm* — RANKIN, HILL & CLARK LLP

(57) ABSTRACT

A gas detection device that gives a notification of a detected gas on the basis of a captured image obtained by capturing an image of a monitoring target, the gas detection device including: a gas detection unit that detects gas on the basis of the captured image and gives a notification of the detected gas; an input unit that receives input information from a user; a mask candidate region extraction unit that extracts a mask candidate region that is a candidate region of a mask region for which a notification of gas detection is suppressed; and a mask generation unit that generates mask data indicating the mask region, in which the gas detection unit gives a notification of a gas detected outside the mask region, and the mask generation unit generates, as the mask data, a region in which first mask candidate region infor- (Continued)

mation input from the input unit matches second mask candidate region information extracted by the mask candidate region extraction unit.

25 Claims, 32 Drawing Sheets

(51) Int. Cl.
*G06V 10/26* (2022.01)
*G06V 10/75* (2022.01)
*G06V 20/52* (2022.01)
*G08B 21/12* (2006.01)

(52) U.S. Cl.
CPC .......... *G06V 10/273* (2022.01); *G06V 10/759* (2022.01); *G06V 20/52* (2022.01); *G08B 21/12* (2013.01)

(56) References Cited

FOREIGN PATENT DOCUMENTS

JP      2013157946 A  *  8/2013  ............. H04N 5/262
WO     2017/073430 A1    5/2017

\* cited by examiner

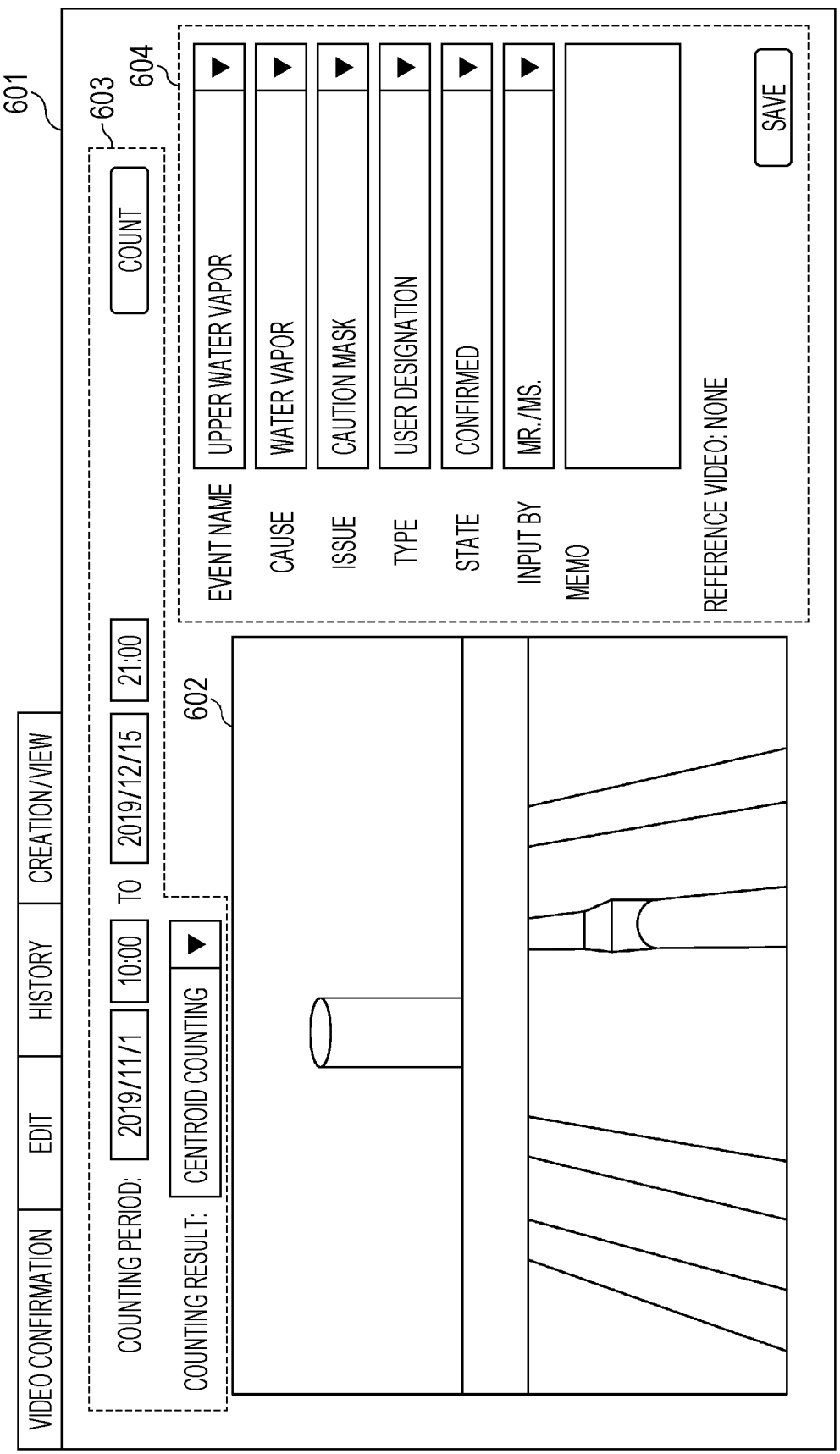

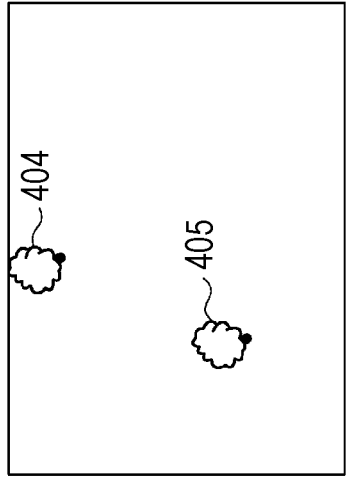
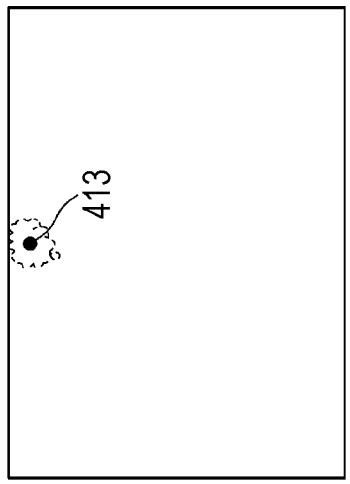
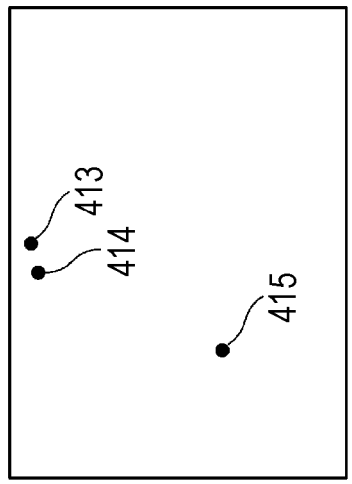
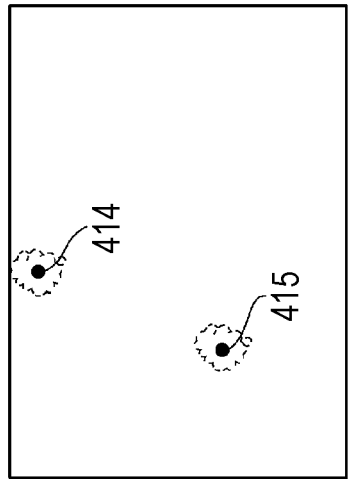

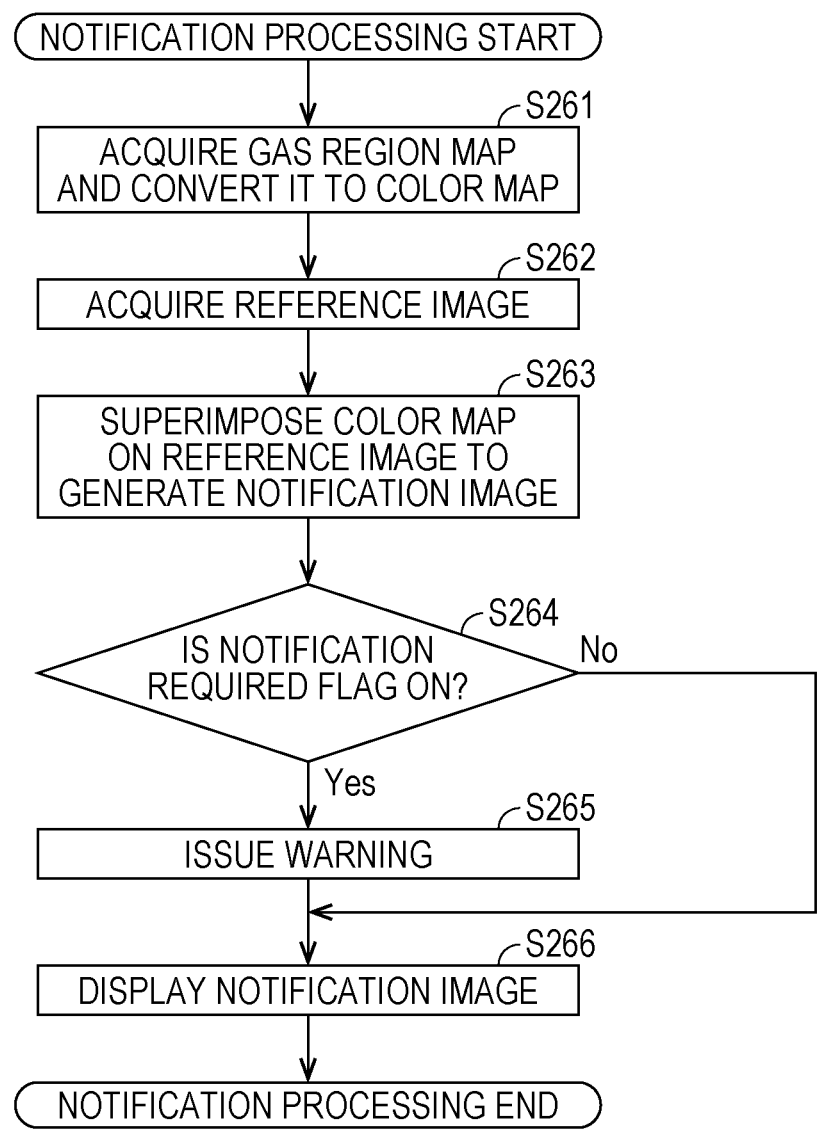

FIG. 24

VIDEO CONFIRMATION | EDIT | HISTORY | CREATION/VIEW

COUNTING PERIOD: 2019/11/1  10:00  TO  2019/12/15  21:00

COUNTING RESULT: CENTROID COUNTING ▶

- 433
- 431
- 432
- 434

602

COUNT

| EVENT NAME | UPPER WATER VAPOR |
| CAUSE | WATER VAPOR |
| ISSUE | CAUTION MASK |
| TYPE | USER DESIGNATION |
| STATE | CONFIRMED |
| INPUT BY | MR./MS. |
| MEMO | |

REFERENCE VIDEO: NONE

SAVE

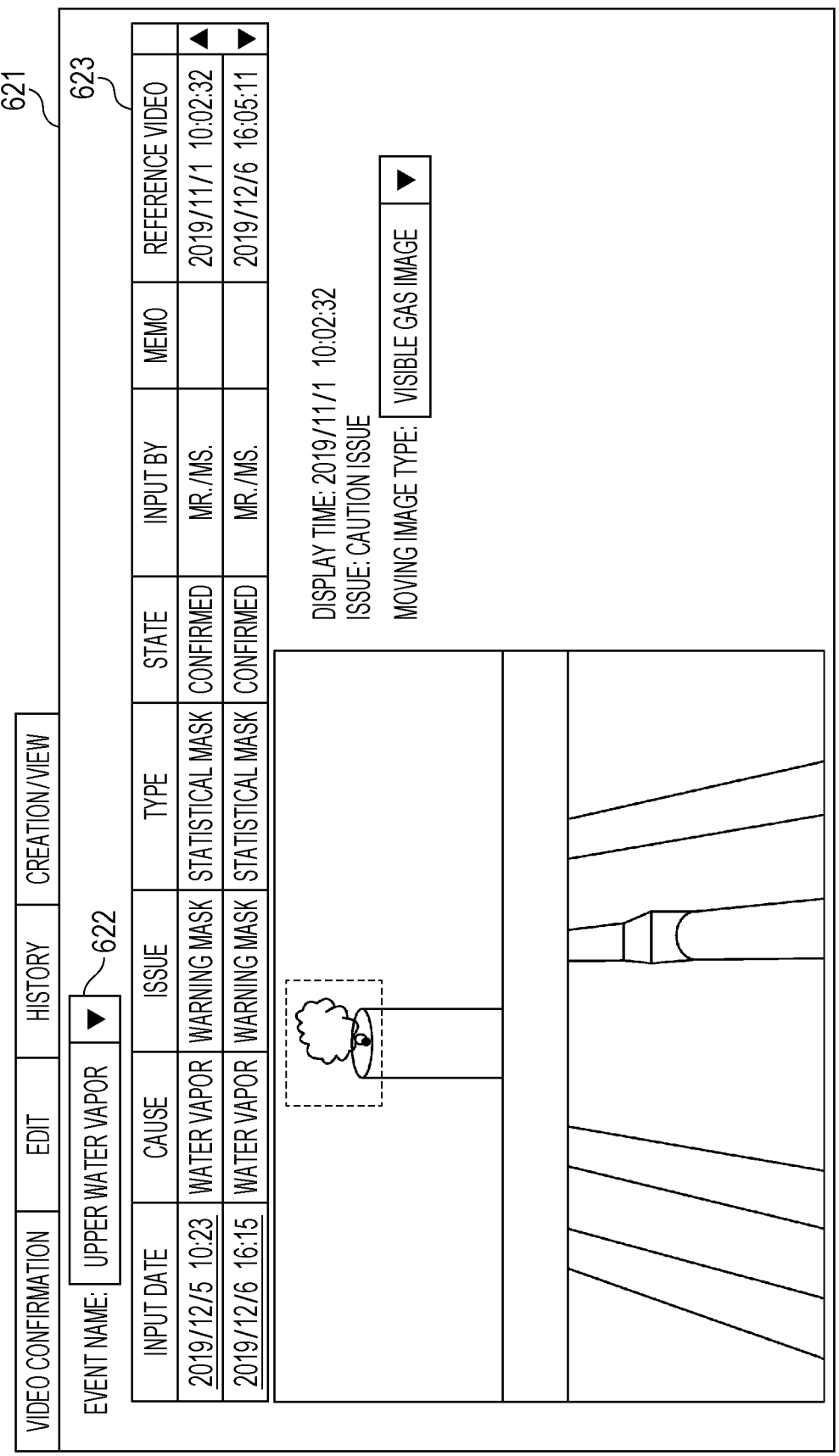

GAS DETECTION DEVICE, GAS DETECTION METHOD, AND GAS DETECTION PROGRAM

TECHNICAL FIELD

The present disclosure relates to a gas detection device, a gas detection method, and a gas detection program for detecting gas present in a space using an image.

BACKGROUND ART

Conventionally, a gas detection device that detects gas present in a space using an image obtained by imaging the space has been known. For example, in a gas detection image processing device disclosed in Patent Literature 1, processing of removing second frequency component data, which has a frequency lower than that of first frequency component data indicating a temperature change due to a leaked gas and indicates a temperature change of the background of a monitoring target, from image data indicating an infrared image is performed on infrared images obtained by imaging the monitoring target at a plurality of times.

CITATION LIST

Patent Literature

Patent Literature 1: WO 2017/073430 A

SUMMARY OF INVENTION

Technical Problem

However, in the processing according to Patent Literature 1, it is not possible to suppress detection of a substance such as water vapor that is likely to be recognized as a gas or detection of a gas that does not require notification and is generated only in a part of an image, such as a shadow of a gas or a substance that is likely to be recognized as a gas. On the other hand, when gas detection is simply not performed in a partial region of the image, there is a possibility that even necessary notification of gas detection is suppressed in a case where setting of the region is inappropriate, and it is difficult to achieve both suppression of unnecessary notification of gas detection and necessary notification of gas detection.

In view of the above problems, an object of an aspect of the present disclosure is to provide a gas detection device and a gas detection method that achieve both suppression of unnecessary notification of gas detection and necessary notification of gas detection.

Solution to Problem

A gas detection device according to an aspect of the present disclosure is a gas detection device that gives a notification of a detected gas on the basis of a captured image obtained by capturing an image of a monitoring target, the gas detection device including: a gas detection unit that detects gas on the basis of the captured image and gives a notification of the detected gas; an input unit that receives input information from a user; a mask candidate region extraction unit that extracts a mask candidate region that is a candidate region of a mask region for which a notification of gas detection is suppressed; and a mask generation unit that generates mask data indicating the mask region, in which the gas detection unit gives a notification of a gas detected outside the mask region, and the mask generation unit generates, as the mask data, a region in which first mask candidate region information input from the input unit matches second mask candidate region information extracted by the mask candidate region extraction unit.

Advantageous Effects of Invention

According to the above aspect, a region in which a first mask candidate region input from the user matches an extracted second mask candidate region is used as the mask. Therefore, it is possible to suppress the notification of gas detection for gas detection for which the user has determined that notification is unnecessary and to give a notification of gas detection for gas detection for which the user has determined that notification is necessary among the mask candidate regions extracted by the mask candidate region extraction unit. As a result, it is possible to achieve both suppression of unnecessary notification of gas detection and necessary notification of gas detection.

BRIEF DESCRIPTION OF DRAWINGS

FIG. 5 is an example of an input reception screen of a counting target period in the mask editing processing.

FIG. 6 is a schematic diagram illustrating an outline of counting processing in the mask editing processing.

FIG. 15 is a flowchart illustrating details of notification processing.

FIG. 24 is a schematic diagram illustrating an outline of counting processing in mask editing processing according to a fourth embodiment.

FIG. 31 is an example of a mask confirmation image in the mask editing processing according to the modification.

FIG. 32 is an example of a mask confirmation image in the mask editing processing according to the modification.

DESCRIPTION OF EMBODIMENTS

First Embodiment

The gas detection device 100 according to the first embodiment will be described below with reference to the drawings.

Figure 1:
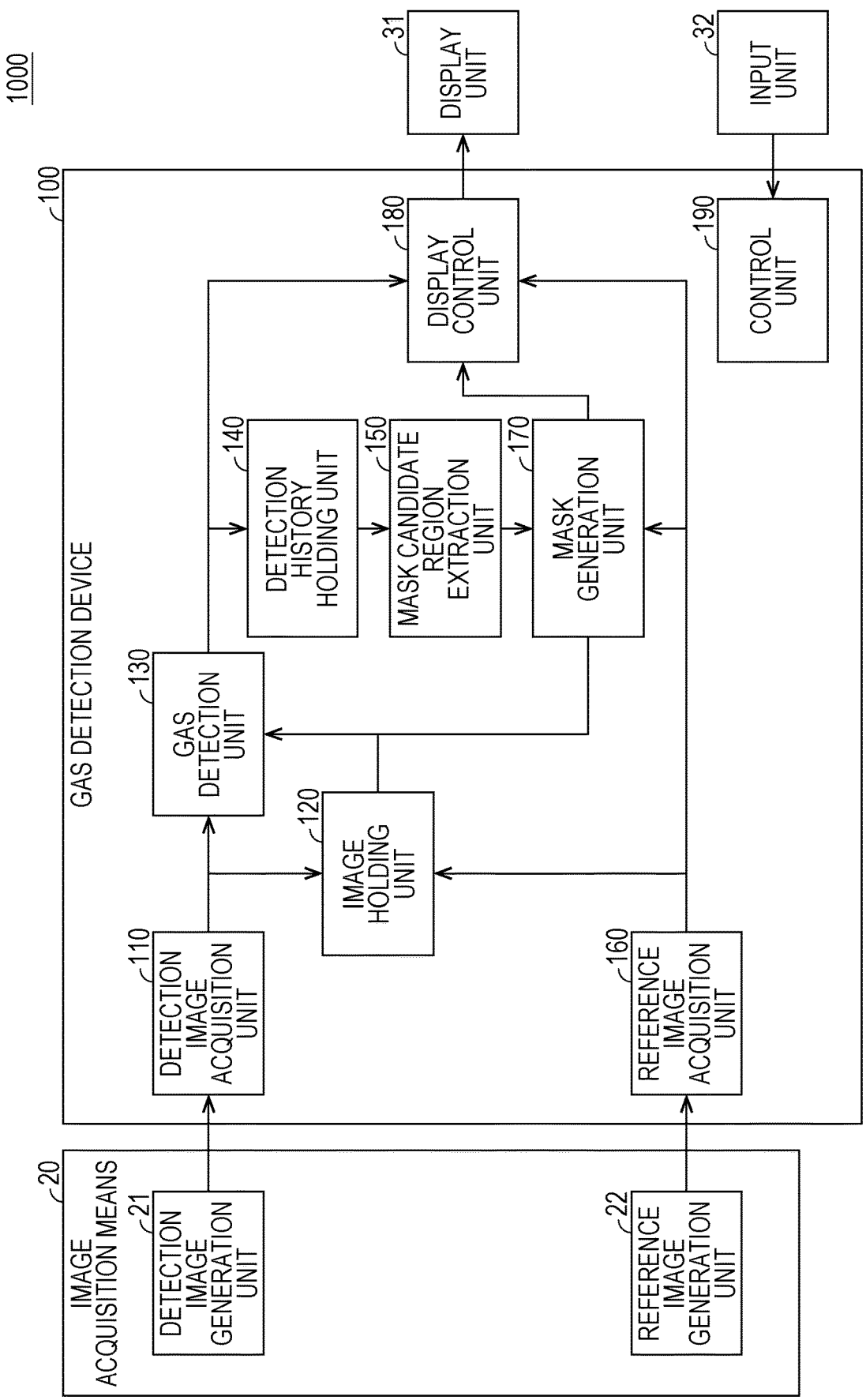
FIG. 1 is a function block diagram of a gas detection system 1000 according to a first embodiment.

FIG. 1 is a function block diagram of the gas detection system 1000 according to the first embodiment. As illustrated in FIG. 1, the gas detection system 1000 includes the image acquisition means 20 for capturing an image of a monitoring target, the gas detection device 100 that detects gas on the basis of the image acquired by the image acquisition means 20, a display unit 31, and an input unit 32. The image acquisition means 20, the display unit 31, and the input unit 32 are each configured to be connectable to the gas detection device 100.

<Image Acquisition Means 20>

The image acquisition means 20 is a device or system that captures an image of a monitoring target and provides the image to the gas detection device 100. In the embodiment, the image acquisition means 20 is a camera including a detection image generation unit 21 and a reference image generation unit 22.

The detection image generation unit 21 is, for example, a so-called infrared camera that detects and images infrared light having a wavelength of 3.2 to 3.4 µm, and can detect hydrocarbon-based gases such as methane, ethane, ethylene, and propylene. The image captured by the detection image generation unit 21 is used as a detection image used for detecting gas in the gas detection device 100.

The reference image generation unit 22 is a so-called general camera that detects and images visible light. The image captured by the reference image generation unit 22 is used in the gas detection device 100 as a reference image useful for management of the monitoring target or for improving convenience of the user, such as specifically specifying the gas detection place by referring to the monitoring target.

Figure 2:
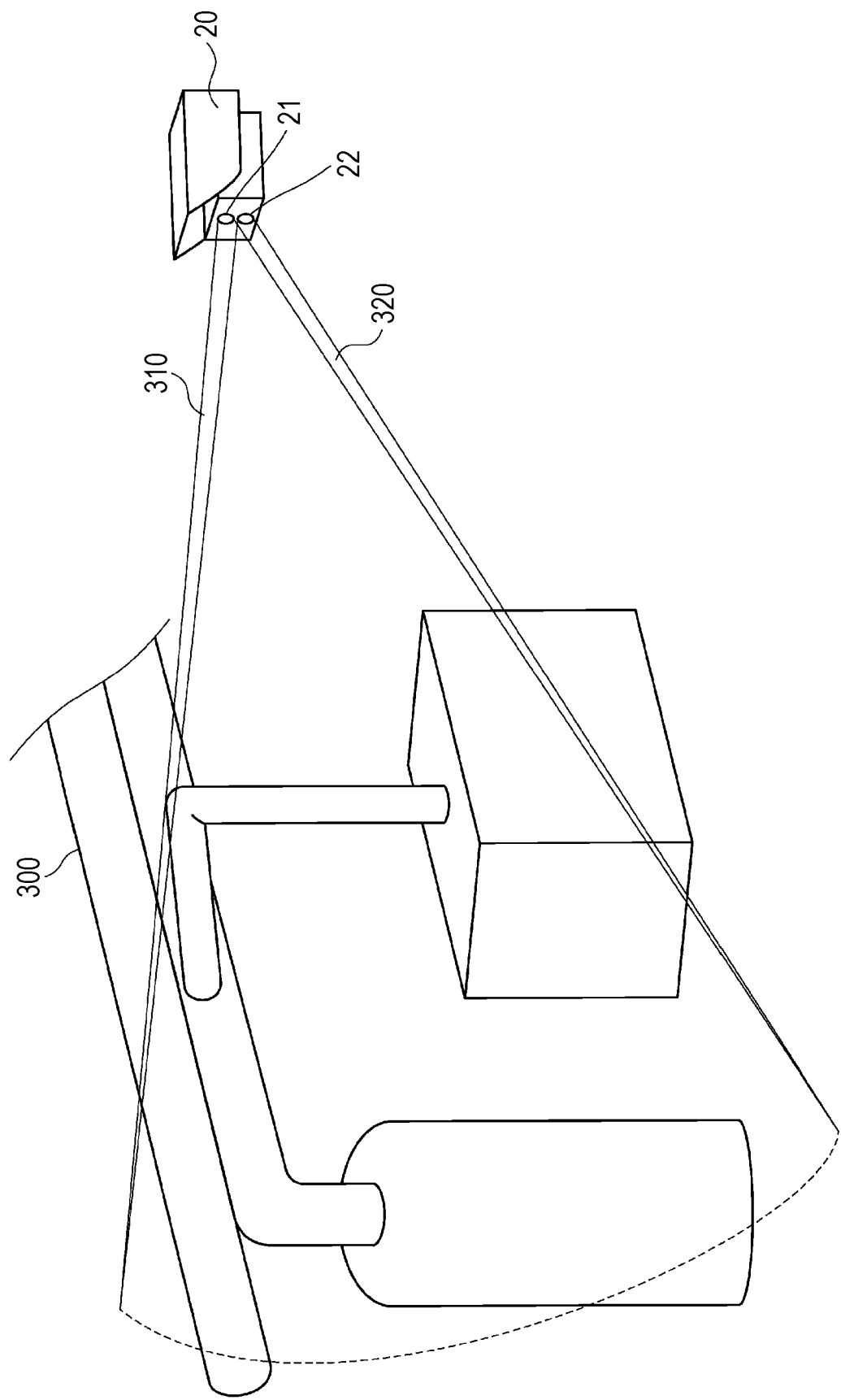
FIG. 2 is a schematic diagram illustrating a relationship between a monitoring target 300 and an image acquisition means 20.

As illustrated in the schematic diagram of FIG. 2, the detection image generation unit 21 and the reference image generation unit 22 are installed such that the monitoring target 300 is included in both a visual field range 310 of the detection image generation unit 21 and a visual field range 320 of the reference image generation unit 22. Note that it is preferable that the visual field range 310 and the visual field range 320 substantially match with each other. In the embodiment, the detection image generation unit 21 and the reference image generation unit 22 are incorporated in one housing, and the image acquisition means 20 is realized as one two-wavelength camera.

Each of the detection image generation unit 21 and the reference image generation unit 22 outputs the captured image as a video signal to the gas detection device 100. The video signal is, for example, a signal for transmitting an image of 30 frames per second.

<Configuration of Gas Detection Device 100>

The gas detection device 100 is a device that acquires the image obtained by capturing the image of the monitoring target from the image acquisition means 20, detects a gas region on the basis of the image, and notifies a user of gas detection through the display unit 31. The gas detection device 100 is realized as, for example, a computer including a general central processing unit (CPU), RAM, and a program executed by the CPU and the RAM. As illustrated in FIG. 1, the gas detection device 100 includes a detection image acquisition unit 110, an image holding unit 120, a gas detection unit 130, a detection history holding unit 140, a mask candidate region extraction unit 150, a reference image acquisition unit 160, a mask generation unit 170, a display control unit 180, and a control unit 190.

The detection image acquisition unit 110 acquires a detection image obtained by capturing the image of the monitoring target from the image acquisition means 20. In the embodiment, the detection image acquisition unit 110 acquires the video signal from the detection image generation unit 21, restores the video signal to an image, and outputs the image to the gas detection unit 130 and the image holding unit 120 as a moving image including a plurality of frames. The detection image is an infrared photograph obtained by capturing the image of the monitoring target, and has infrared intensity as a pixel value.

The image holding unit 120 is a storage medium that holds the detection image, which is a moving image, output by the detection image acquisition unit 110, and is realized by, for example, a hard disk drive, a solid state drive, semiconductor memory, or the like. Note that the image holding unit 120 also holds a reference image, which is a moving image, output by the reference image acquisition unit 160 to be described below.

The gas detection unit 130 acquires a plurality of detection images from the detection image acquisition unit 110 and the image holding unit 120, detects gas from the detection images, and when it is determined that notification is necessary, gives a notification. The gas detection that requires notification refers to gas detection that has occurred in a place other than a region (hereinafter, referred to as a "mask region") on the detection image that does not require notification. The gas detection unit 130 acquires the mask data from the mask generation unit 170, and does not give a notification of gas detection occurring in the mask region but gives a notification of gas detection occurring outside the mask region.

The detection history holding unit 140 is a database that holds a range of the gas region detected by the gas detection unit 130 on the detection image or its representative position.

The mask candidate region extraction unit 150 creates candidate data of the mask region that is a region where gas detection is not performed at a position on the detection image. The candidate data of the mask region is created on the basis of the history of gas detection. Details will be described below.

The reference image acquisition unit 160 acquires a reference image obtained by capturing the image of the monitoring target from the image acquisition means 20. In the embodiment, the reference image acquisition unit 160 acquires the video signal from the reference image generation unit 22, restores the video signal to an image, and outputs the image to the mask generation unit 170, the display control unit 180, and the image holding unit 120 as a moving image including a plurality of frames.

The mask generation unit 170 generates mask data that is data indicating a mask region. The mask data includes a user-designated mask (first region) that unconditionally sets the entire region designated by the user as a mask area, and a statistical mask (second region) that is set on the basis of the history of gas detection in the region designated by the user. The statistical mask is created on the basis of the candidate data of the mask region created by the mask candidate region extraction unit 150. When the user instructs the gas detection device 100 to enter a mask generation mode, the mask generation unit 170 generates mask data according to the user's instruction and holds the mask data. Details will be described below. Furthermore, when the user instructs the gas detection device 100 to enter a gas detection mode, the mask generation unit 170 outputs the latest mask data to the gas detection unit 130.

When the gas detection device 100 is in the gas detection mode, the display control unit 180 generates a notification image by superimposing information of the gas region detected by the gas detection unit 130 or a notification of gas detection on the reference image acquired from the reference image acquisition unit 160, and outputs the notification image to the display unit 31. The information of gas is indicated by, for example, converting the gas amount into color information and mapping the color information to the position where the gas is detected. Furthermore, the notification of gas detection is performed, for example, by displaying a red frame on the outer periphery of the notification image or superimposing an icon in the notification image. The display control unit 180 outputs the generated image to the display unit 31 to display.

The control unit 190 switches the operation mode of the gas detection device 100 from the gas detection mode to the mask generation mode or from the mask generation mode to the gas detection mode on the basis of the instruction from the user received via the input unit 32. Furthermore, in the mask generation mode, the control unit 190 inputs the instruction from the user received via the input unit 32 to the mask generation unit 170.

<Other Configurations>

The display unit 31 is, for example, a display device such as a liquid crystal display or an organic EL display.

The input unit 32 is, for example, an input device such as a keyboard, a mouse, or a trackball.

Note that the display unit 31 and the input unit 32 may be realized as one device that doubles as a display device and an input device, such as a touch panel or a tablet.

<Operation>

Hereinafter, the operation of the gas detection device 100 according to the present embodiment will be described below with reference to the drawings.

Figure 3:
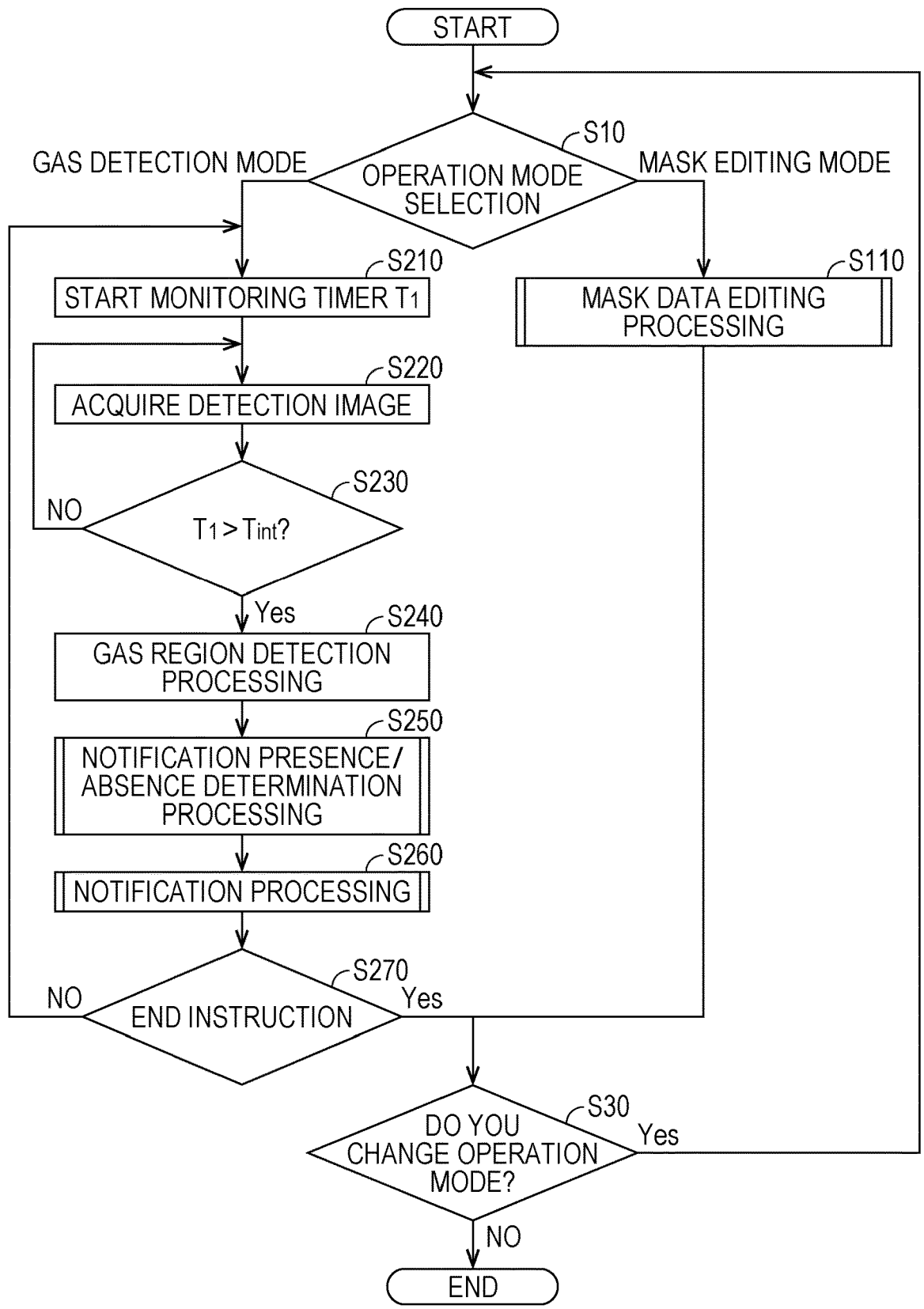
FIG. 3 is a flowchart illustrating an operation of a gas detection device 100 according to the first embodiment.

FIG. 3 is a flowchart illustrating an overall operation of the gas detection device 100 according to the present embodiment.

First, the gas detection device 100 receives an operation mode instruction from the user via the input unit 32 (step S10). Then, in the case of a mask editing mode, mask data editing processing of step S110 is performed, and in the case of the gas detection mode, gas detection processing from steps S210 to S270 is performed. Then, an instruction indicating whether or not to change the operation mode is received (step S30), the processing returns to step S10 when the operation mode is changed, and the processing ends when the operation mode is not changed.

<Details of Mask Editing Operation>

Hereinafter, the mask data editing processing (step S110) in the mask editing mode will be described in more detail.

Figure 4:
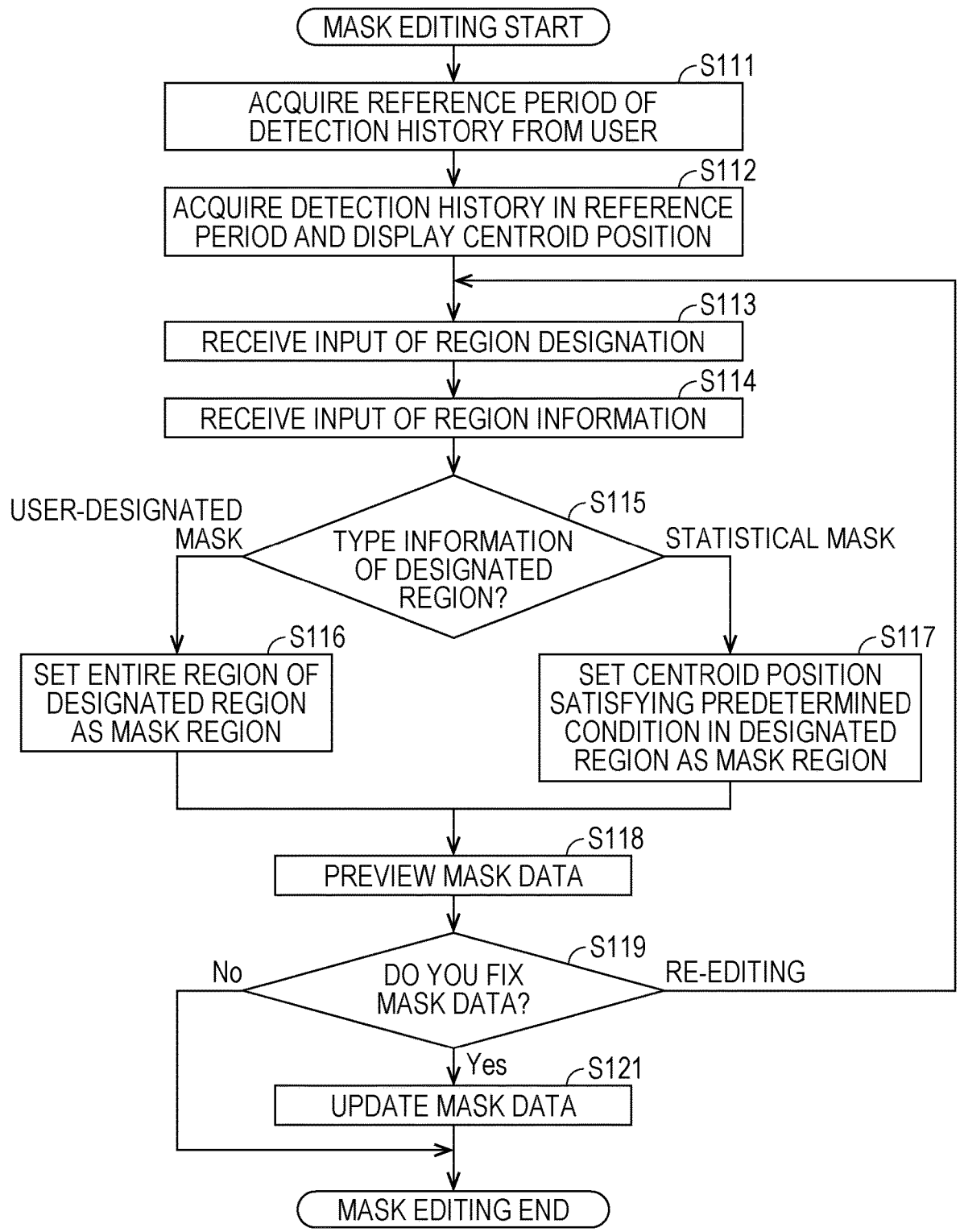
FIG. 4 is a flowchart illustrating details of mask editing processing.

FIG. 4 is a flowchart illustrating details of the mask data editing processing.

First, a reference period of the detection history is acquired from the user (step S111). The reference period of the detection history indicates which period of history is used in creating the mask on the basis of the gas detection history. FIG. 5 is an example of an input screen 601, and the user inputs the reference period of the detection history to a period designation unit 603. Note that, in FIG. 5, the reference image is displayed on an image reference portion 602, but it is for confirmation of the monitoring target and it is not always necessary.

Next, the mask candidate region extraction unit 150 acquires the detection history within the input reference period from the detection history holding unit 140, and displays the centroid position (step S112). The centroid position is a representative position of the gas region, and the detection history holding unit 140 holds the detection history of the gas region by a combination of the detection date and time and the centroid position.

Figure 7A:
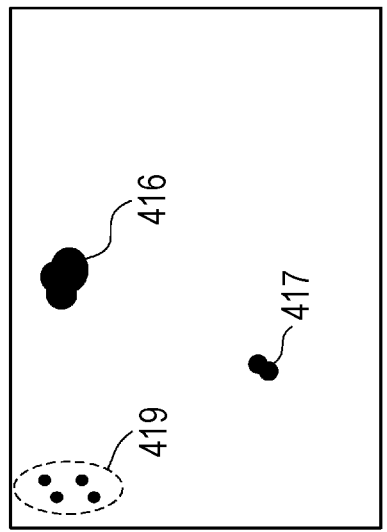
FIG. 7 is a schematic diagram illustrating an outline of counting processing in the mask editing processing.
Figure 7B:
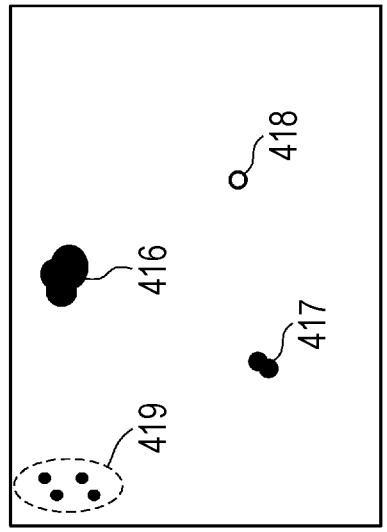

Here, the centroid position will be described in detail. For example, the center position of the gas region can be used as the centroid position, and, more specifically, an average value of the X coordinates and an average value of the Y coordinates are calculated regarding all the pixels present in the gas region, and the position where the average value of the X coordinates is set as the X coordinate and the average value of the Y coordinates is set as the Y coordinate can be set as the centroid. For example, when a gas region 403 as illustrated in FIG. 6A is detected in the gas detection processing, a combination of a centroid position 413 illustrated in FIG. 6B and the detection time is held in the detection history holding unit 140 as a detection history. Similarly, when a gas region 404 and a gas region 405 as illustrated in FIG. 6C are detected in the gas detection processing, each of a centroid position 414 and a centroid position 415 illustrated in FIG. 6E is combined with the detection time and the combination is held in the detection history holding unit 140 as a detection history. The mask candidate region extraction unit 150 acquires a detection history within the input reference period and maps the detection history on one gas centroid map. For example, the gas centroid map illustrated in FIG. 6E is formed from history data of FIG. 6B and history data of FIG. 6D. By performing this processing on all the detection histories within the reference period, for example, a gas centroid map as illustrated in FIG. 7A is formed. Finally, by removing the centroid at which the gas generation frequency is less than a predetermined threshold value (for example, 0.01%), a gas centroid map indicating a position at which the gas is detected at a frequency equal to or more than the predetermined threshold value is generated as illustrated in FIG. 7B. Here, the reason why the centroid at which the gas generation frequency is less than the predetermined threshold value is removed is that it is expected that there will be no effect even if the statistical mask is set for a portion where the gas generation frequency is low. In the embodiment, as illustrated in a display region 602 in a screen 601 illustrated in FIG. 8, the gas centroid map including centroids 431, 432, and 433 of the gas regions is displayed to be superimposed on a reference image Ref. Note that the reason for superimposing on the reference image is to facilitate designation of the mask region and selection of the type of the mask by the user.

Description continues with reference back to FIG. 4. Next, an input of mask region designation is received from the user (step S113). The input of the mask region designation is performed, for example, by region selection using a mouse on an image in which the gas centroid map is superimposed on the reference image.

Next, an input of region information of a mask region is received from the user (step S114). The region information is, for example, information indicating whether the type of the mask of the mask region is a statistical mask or a user-designated mask.

Next, in a case where the mask type information included in the region information input from the user is the user-designated mask, the mask generation unit 170 sets the entire region designated in step S113 as the mask region (step S116). On the other hand, in a case where the mask type information is the statistical mask, the mask generation unit 170 sets, as the mask region, the centroid included in the region designated in step S113 among the centroids included in the gas centroid map generated and displayed by the mask candidate region extraction unit 150 in step S112 (step S117).

Figure 8:
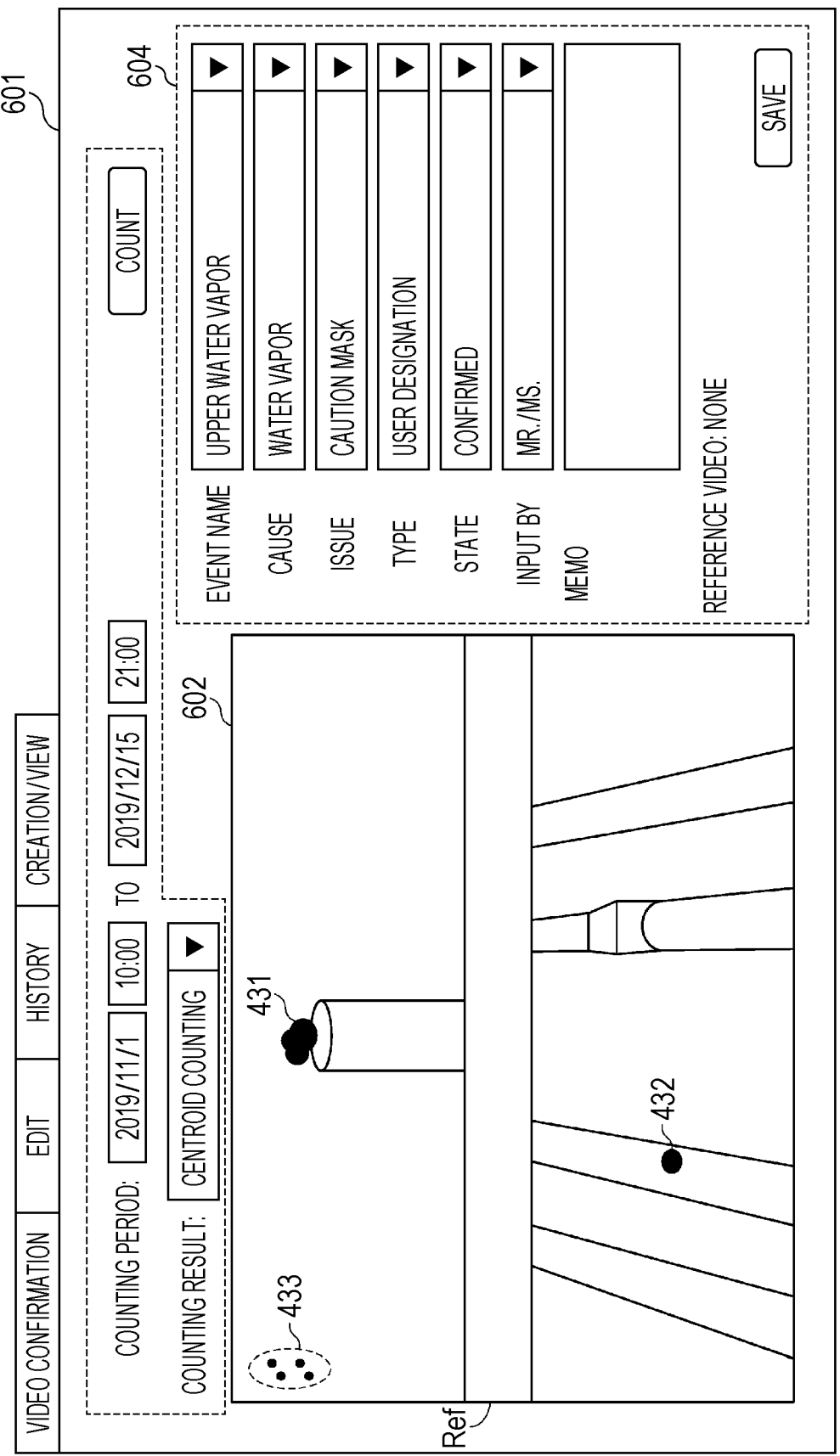
FIG. 8 is a display example of a gas detection history in the mask editing processing.
Figure 9:
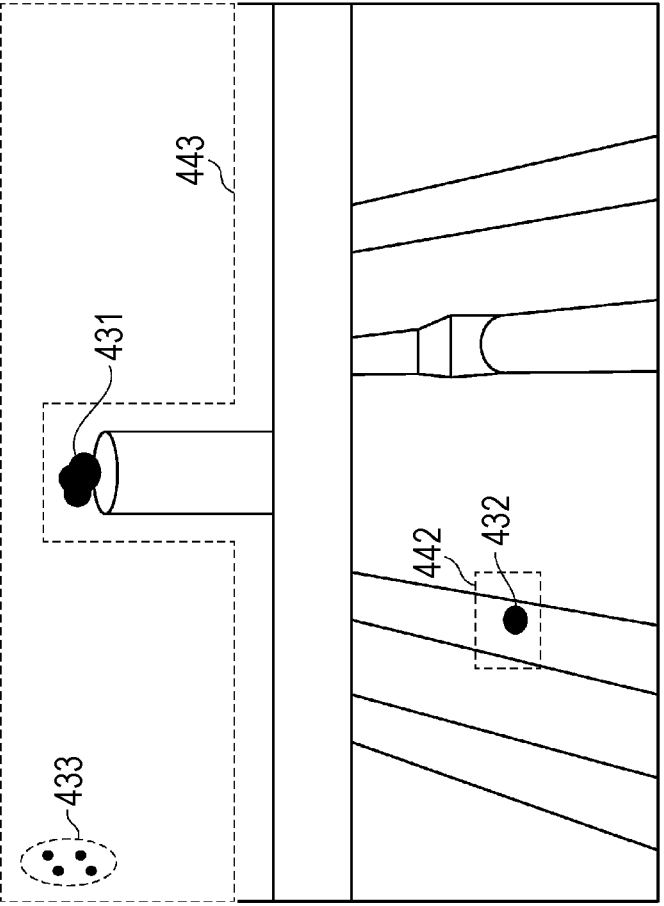
FIG. 9 is an input example of a user-designated mask in the mask editing processing.
Figure 10:
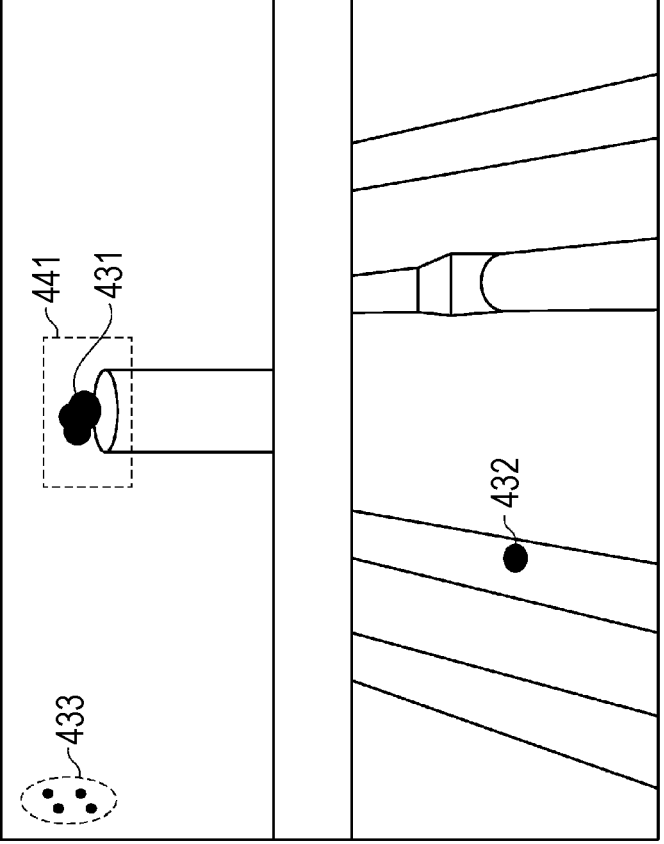
FIG. 10 is an input example of a statistical mask in the mask editing processing.

The processing from steps S113 to S117 will be described in more detail using a specific example. FIG. 8 illustrates the screen 601 displayed in step S112, and sets of centroids 431, 432, and 433 of the gas regions are displayed in a display region 602. On the other hand, FIG. 9 illustrates a state in which the user selects a region 443 and inputs the user-designated mask in an input field 604. Thus, the entire region 443 is designated as a mask region. Therefore, in a case where it is not necessary to give a notification of the gas detection for the entire region, it is possible to suppress the notification of the gas detection by setting the entire region as the mask region. Examples of the region for which it is not necessary to give a notification of the gas detection for the entire region include a region in which an unmanaged facility is imaged, and a region in which a scene or sky behind a monitoring target is imaged, and the like. In this example, a set of centroids 433 of the gas regions can be confirmed in a part of the region 443, but this is a trace that the water vapor that has flown into is erroneously recognized as gas, and the centroid is not located at one place. Therefore, by setting the entire region 443, which is empty, as a user-designated mask, it is possible to suppress notification of water vapor that has flown in and does not overlap the set of centroids 433. On the other hand, FIG. 10 is a state in which the user selects a region 441 and inputs the statistical mask in an input field 604. As a result, a region 431 based on the centroid of the gas region included in the region 441 is designated as the mask region. Therefore, for example, it is possible to suppress notification of the gas detection repeatedly occurring at the same location and to give a notification of the gas detection occurring at another location. In this example, the set of centroids 431 is water vapor erroneously recognized as gas, and the position of the centroid is concentrated in the narrow region 441. Therefore, notification of similar water vapor can be suppressed by the statistical mask region 431, and notification of the gas region inside the region 441 but not included in the region 431 can be performed.

Figure 11:
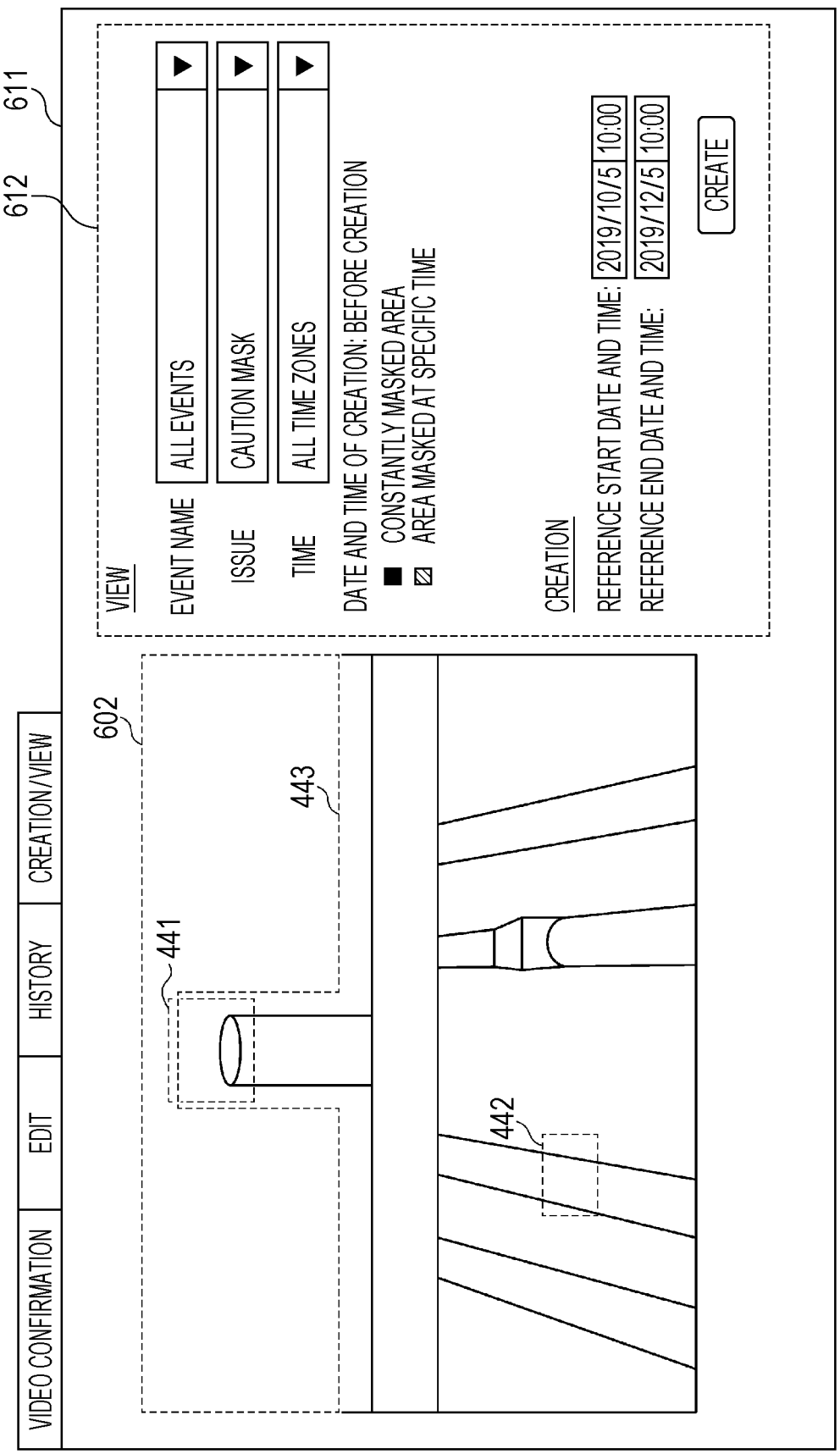
FIG. 11 is a display example of a user-selected region in the mask editing processing.
Figure 12:
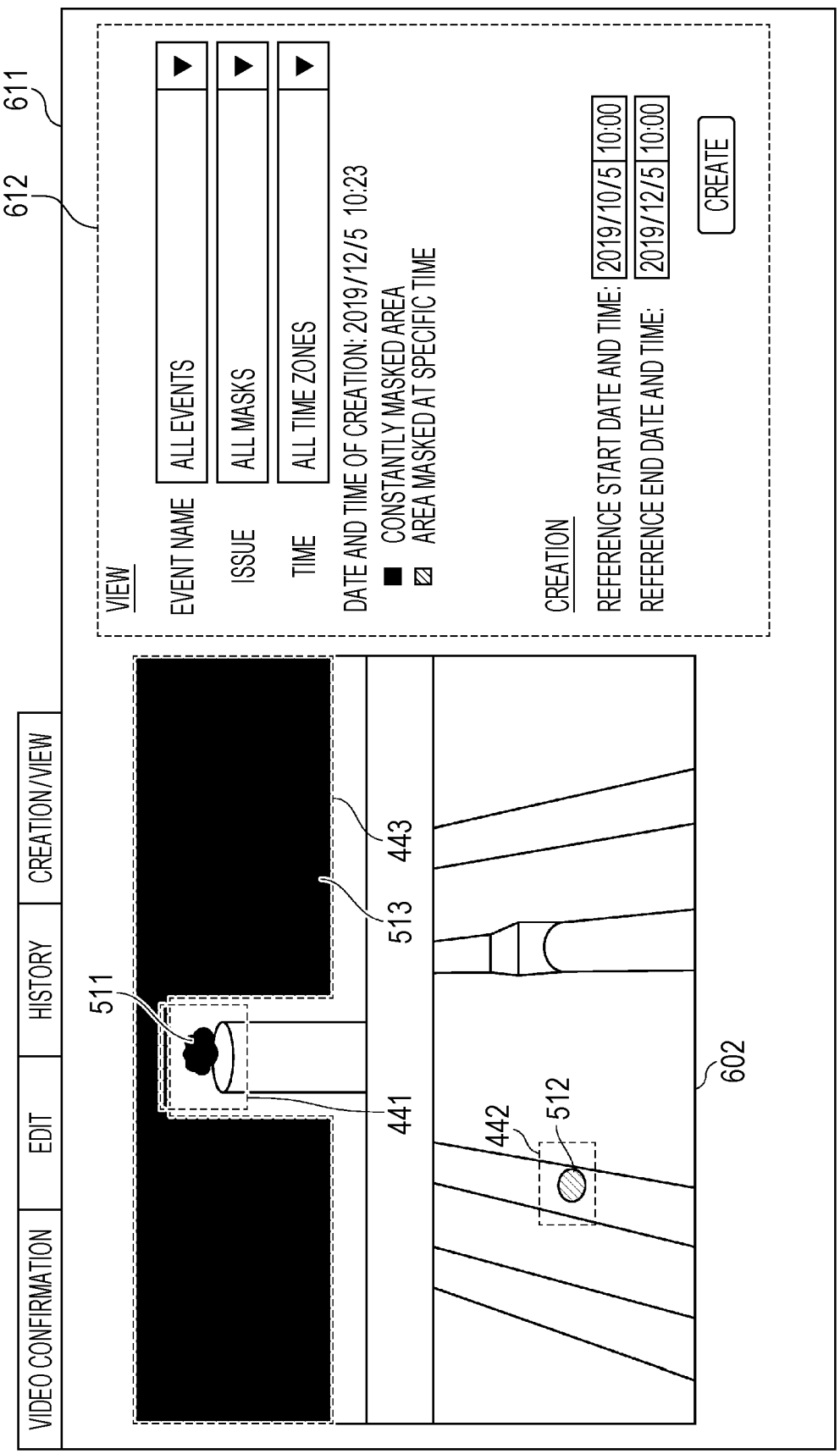
FIG. 12 is a display example of a mask region in the mask editing processing.

Next, the mask data is displayed on the display unit 31 (step S118). As a mask data display aspect, for example, an image indicating a region input by the user as illustrated in FIG. 11 and an image indicating a mask region as illustrated in FIG. 12 are displayed.

Next, an input as to whether or not to fix the mask data is received from the user (step S119). When the user fixes the mask data, the mask generation unit 170 holds the generated mask data as the latest mask data (step S121). Furthermore, in the embodiment, in a case where the user continues editing the mask data, the processing returns to step S113 to continue the generation of the mask data, and in a case where the user gives an instruction to discard a mask editing result, the processing ends without updating the mask data.

<Details of Gas Detection Mode Operation>

Hereinafter, the operation of the gas detection device 100 in the gas detection mode will be described below in more detail.

Hereinafter, description will be given on the basis of the flowchart of FIG. 3.

First, a monitoring timer $T_1$ is started (step S210). Then, a detection image is acquired (step S220).

Next, it is checked whether the value of the monitoring timer $T_1$ exceeds a predetermined threshold value $T_{int}$ (step S230), and when the value does not exceed the predetermined threshold value $T_{int}$, the processing returns to step S220, and when the value exceeds the threshold value $T_{int}$, the processing proceeds to step S240. The threshold value $T_{int}$ is an interval between start times of repeatedly performed gas detection processing, and is 10 seconds in the embodiment.

Figure 13:
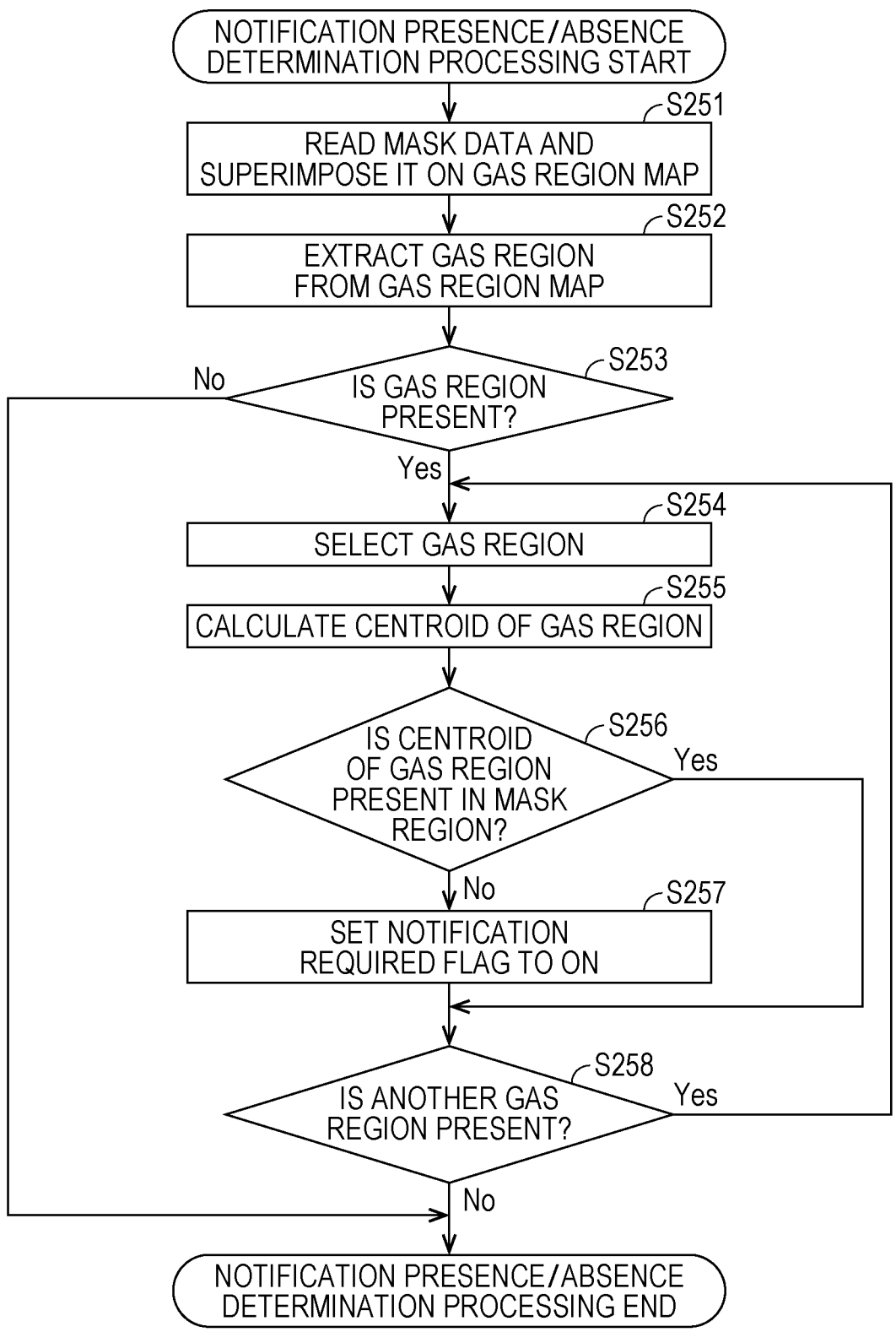
FIG. 13 is a flowchart illustrating details of gas detection notification presence/absence determination processing.

When the value of the monitoring timer $T_1$ exceeds the threshold value $T_{int}$ (Yes in step S230), the gas detection processing is performed on the basis of the detection image (step S240). A known method can be used for the gas detection processing. Specifically, for example, a method described in WO 2017/073430 A (Patent Literature 1) can be used. As a result, a gas region map in which a detection point at which the presence of gas is determined is mapped is generated. Next, gas detection notification presence/absence determination processing is performed (step S250). FIG. 13 is a flowchart illustrating details of gas detection notification presence/absence determination processing.

First, the mask data is acquired from the mask generation unit 170 and superimposed on the gas region map generated in step S245 (step S251).

Next, a gas region is extracted from the gas region map (step S252). The gas region is a set of continuous detection points at which the presence of gas is determined.

Next, it is determined whether a gas region is present (step S253). When the gas region is not present, the notification presence/absence determination processing ends. When a gas region is present, one gas region is selected (step S254), and the centroid of the gas region is calculated (step S255).

Since the method of calculating the centroid has been described in the mask editing processing, it is omitted. Then, it is determined whether or not the calculated centroid of the gas region is present in the mask region (step S256). When the centroid of the gas region is not present in the mask region, a notification required flag is set to ON (step S257), and when the centroid of the gas region is present in the mask region, step S257 is not performed. Then, it is determined whether or not an unprocessed gas region is present (step S258), and when it is present, the processing returns to step S254.

Figure 14C:
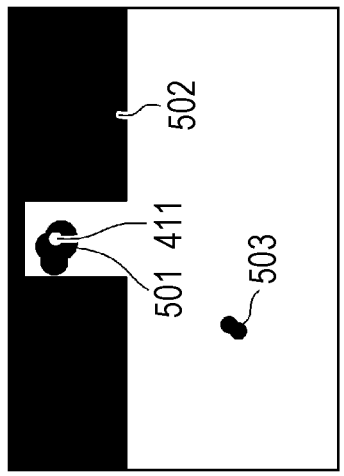
FIG. 14 is a schematic diagram illustrating a relationship between a mask region and a centroid of a gas region in the gas detection notification presence/absence determination processing.
Figure 14A:
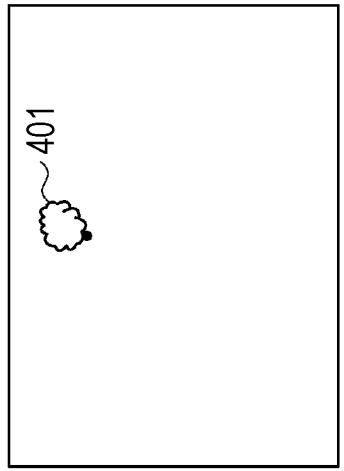
Figure 14B:
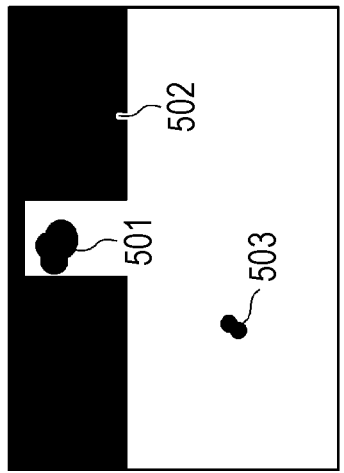
Figure 14E:
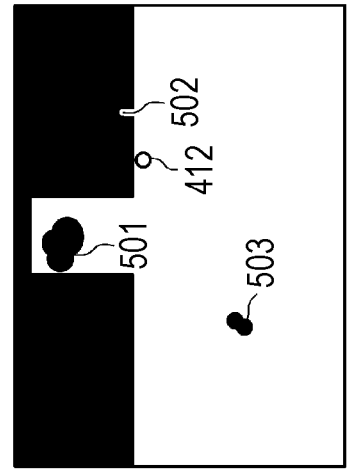
Figure 14D:
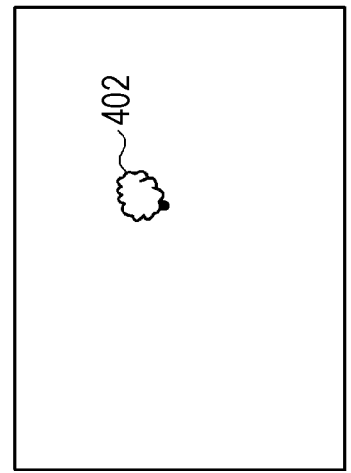

The above processing will be described more specifically. FIG. 14 is an example of the mask data and the gas region map. FIG. 14A is mask data, and FIGS. 14B and 14D are gas region maps. FIG. 14C is a state in which a centroid 411 of a gas region 401 illustrated in FIG. 14B is superimposed on the mask data. In this case, since the centroid 411 is present in the region of a mask region 501, the notification required flag is left as it is. On the other hand, FIG. 14E is a state in which a centroid 412 of a gas region 402 illustrated in FIG. 14D is superimposed on the mask data. In this case, since the centroid 412 is not present in any region of mask regions 501, 502, and 503, the notification required flag is set to ON. That is, by the present processing, when there is at least one gas region outside the mask region, the notification required flag is set to ON. Furthermore, when there is no gas region or when the centroids of all the gas regions are within the mask region, the notification required flag is unchanged.

Description continues with reference back to FIG. 3. Next, notification processing is performed (step S260). FIG. 15 is a flowchart illustrating details of notification processing.

First, the gas region map is acquired and converted into a color map (step S261). Specifically, a color map in which a color such as red is mapped to a position corresponding to a detection point at which gas is detected in the gas region map is created. Note that the color of the color map may be changed according to the concentration of gas or the like.

Next, a reference image is acquired from the reference image acquisition unit 160 (step S262). Then, the color map is superimposed on the reference image (step S263). As a result, a notification image in which the region where the gas is detected in the reference image is colored is generated.

Next, an inquiry as to whether the notification required flag is in an ON state is made through the gas detection unit 130 (step S264). When the notification required flag is not ON, the processing proceeds to step S266. On the other hand, when the notification required flag is ON, a warning is issued (step S265). The warning is performed, for example, by performing one or more of changing the aspect of the notification image, turning on or blinking a warning lamp, reproducing a warning sound, and the like. Examples of the change of the aspect of the notification image include adding a red outer frame to the notification image, adding a blinking red outer frame to the notification image, superimposing an icon indicating a warning on the notification image, and the like.

Finally, the generated notification image is output to and displayed on the display unit 31 (step S266).

Description continues with reference back to FIG. 3. Next, it is determined whether there is an instruction to end the gas detection mode from the user via the input unit 32 (step S270), and when there is no instruction, the processing returns to step S210, and when there is an instruction, the processing proceeds to step S30.

Summary

With the above configuration, in the gas detection device that performs gas detection using an image, it is possible to configure to perform a necessary notification of gas detection while suppressing unnecessary notification of gas detection. For example, since notification of gas detection is unnecessary for a region in which a background scene or sky of a monitoring target, unmanaged facilities, and the like are captured, it is possible to completely suppress notification of gas detection for the region by setting the region as a user-designated region. On the other hand, in a region where gas detection that requires notification and gas detection that does not require notification are mixed, for example, in a case where a release exhaust port, a safety valve, or the like of water vapor that is likely to be erroneously detected as a gas is present in the vicinity of a region where notification of gas detection is to be performed, regarding the gas detection that repeatedly occurs at the same location, it is possible to suppress notification by setting a region where a region input by the user (first mask candidate region information) and an extracted mask candidate region (second mask candidate region information) match (overlap) as a mask region, and it is possible to perform notification for other gas detection. Therefore, it is possible to suppress notification of gas detection for which notification is unnecessary and to issue a notification of gas detection for which notification is necessary without suppressing the notification.

First Modification

In the first embodiment, single-pattern mask data is used regardless of time in the gas detection processing, but, for example, mask data may be selectively used according to time, season, or the like.

In the first modification, a case of selectively using mask data according to time will be described.

Figure 16:
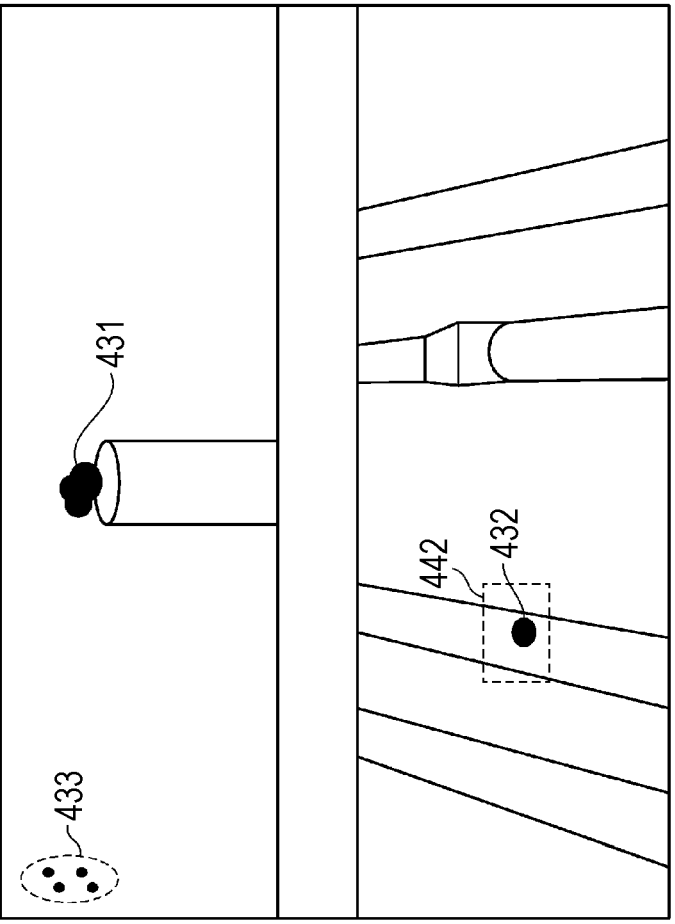
FIG. 16 is an input example of a time-designated mask in the mask editing processing according to a first modification.

FIG. 16 is an example of an input screen of a time-designated mask. In FIG. 16, a centroid set 432 of gas regions is a gas region frequently detected in the 10:00 AM zone, and is a shadow of water vapor related to the centroid region 431 in which water vapor is detected as a gas region. That is, the gas region related to the centroid region 431 of the gas region absorbs the infrared component included in the sunlight, and the shadow of the gas region is formed in the vicinity of the centroid set 432. Since the position of the shadow changes depending on the time, it is preferable to provide a mask for suppressing such notification of gas detection for each time. The user can suppress a warning for the gas region in which the centroid position is present in the centroid set 432 in the 10:00 AM zone by setting the information of the statistical mask and the mask valid in the 10:00 AM zone for the region.

Figure 17:
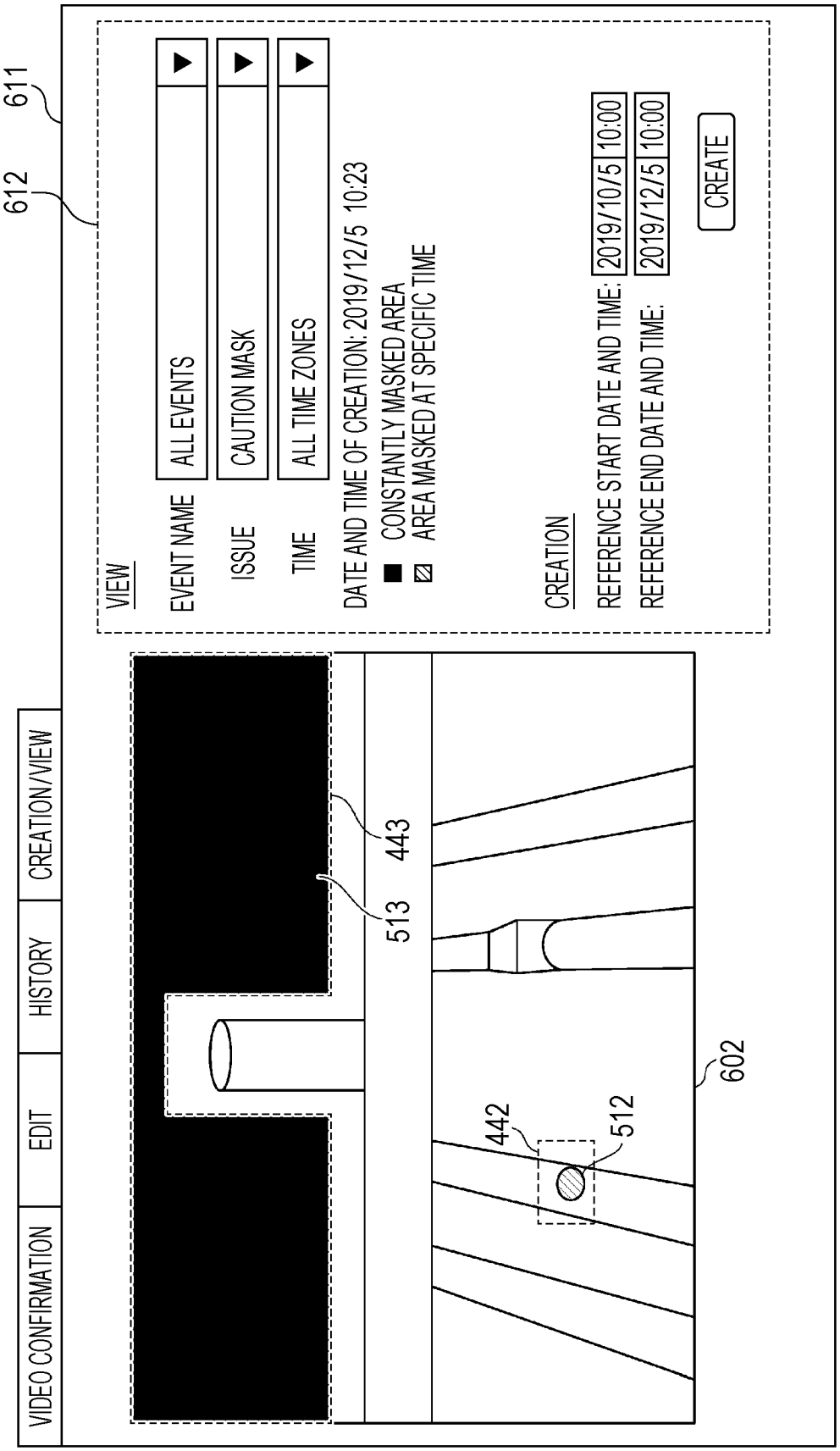
FIG. 17 is an example of a mask confirmation image in the mask editing processing according to the first modification.
Figure 18:
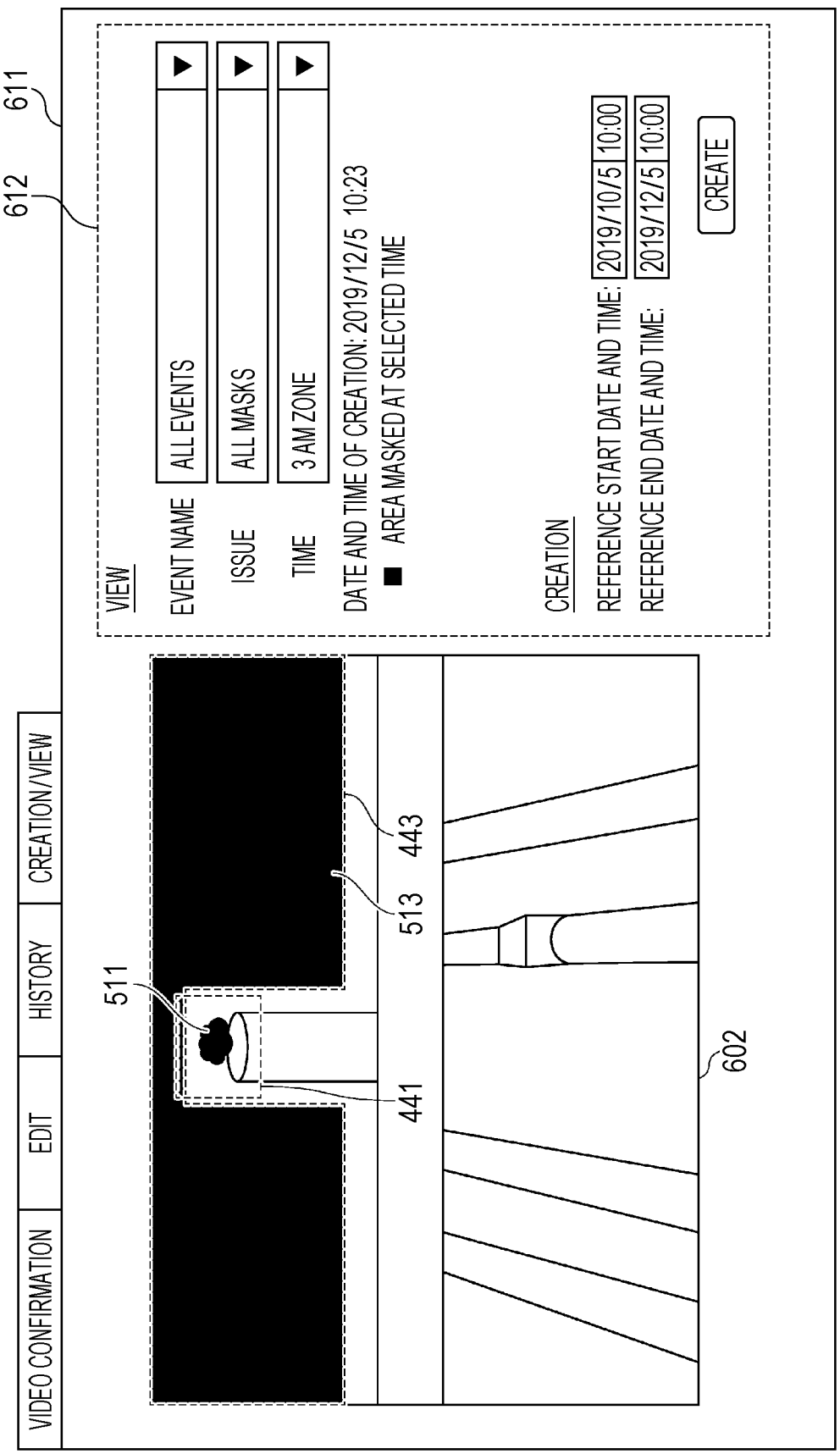
FIG. 18 is an example of a mask confirmation image in the mask editing processing according to the first modification.
Figure 19:
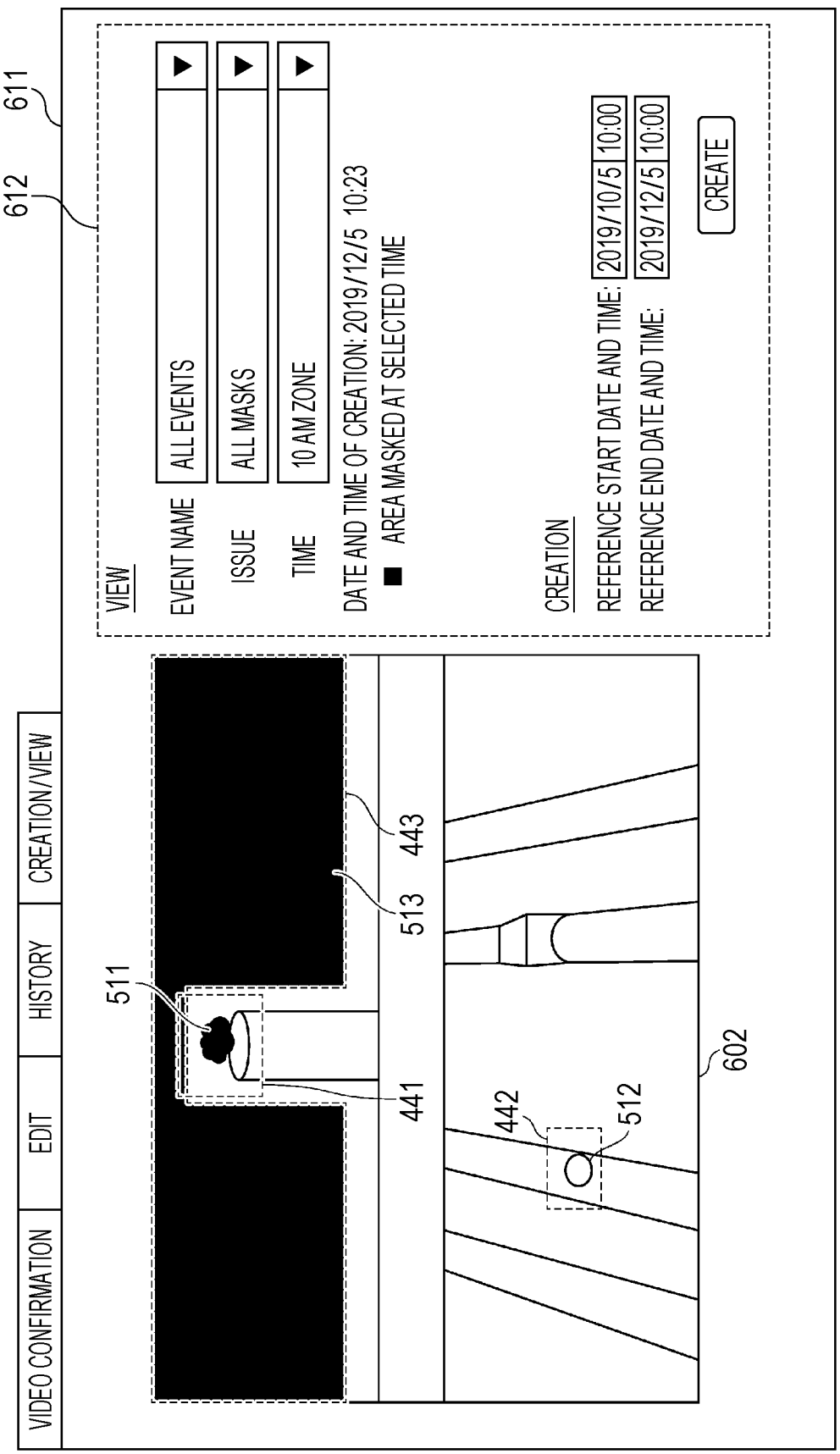
FIG. 19 is an example of a mask confirmation image in the mask editing processing according to the first modification.

Note that such a time-designated mask may have a display aspect different from a normal mask (time-non-designated mask) as illustrated in FIG. 17, for example, at the time of mask editing. This facilitates mask editing work of the user. Furthermore, as illustrated in FIGS. 18 and 19, a mask to be applied for each time may be displayed.

Summary

With the above configuration, in the gas detection device that performs gas detection using an image, it is possible to configure to issue a necessary warning while suppressing an unnecessary warning. In particular, a gas region for which notification is unnecessary and that can occur only at a specific time, for example, a shadow of the gas region, an exhaust port that releases water vapor that is likely to be erroneously detected as gas at a specific time, and the like can be excluded from the notification target in pinpoint.

Second Embodiment

In the first embodiment, the notification in a case where the notification of gas detection is not suppressed is only one type of warning. However, for example, two or more warning levels may be provided, such as issuing a caution for gas detection with low urgency and issuing a warning for gas detection with high urgency.

In the second embodiment, this is realized by a configuration in which a caution is issued when gas is detected and a warning is issued when the caution continues for a certain period of time.

Figure 20:
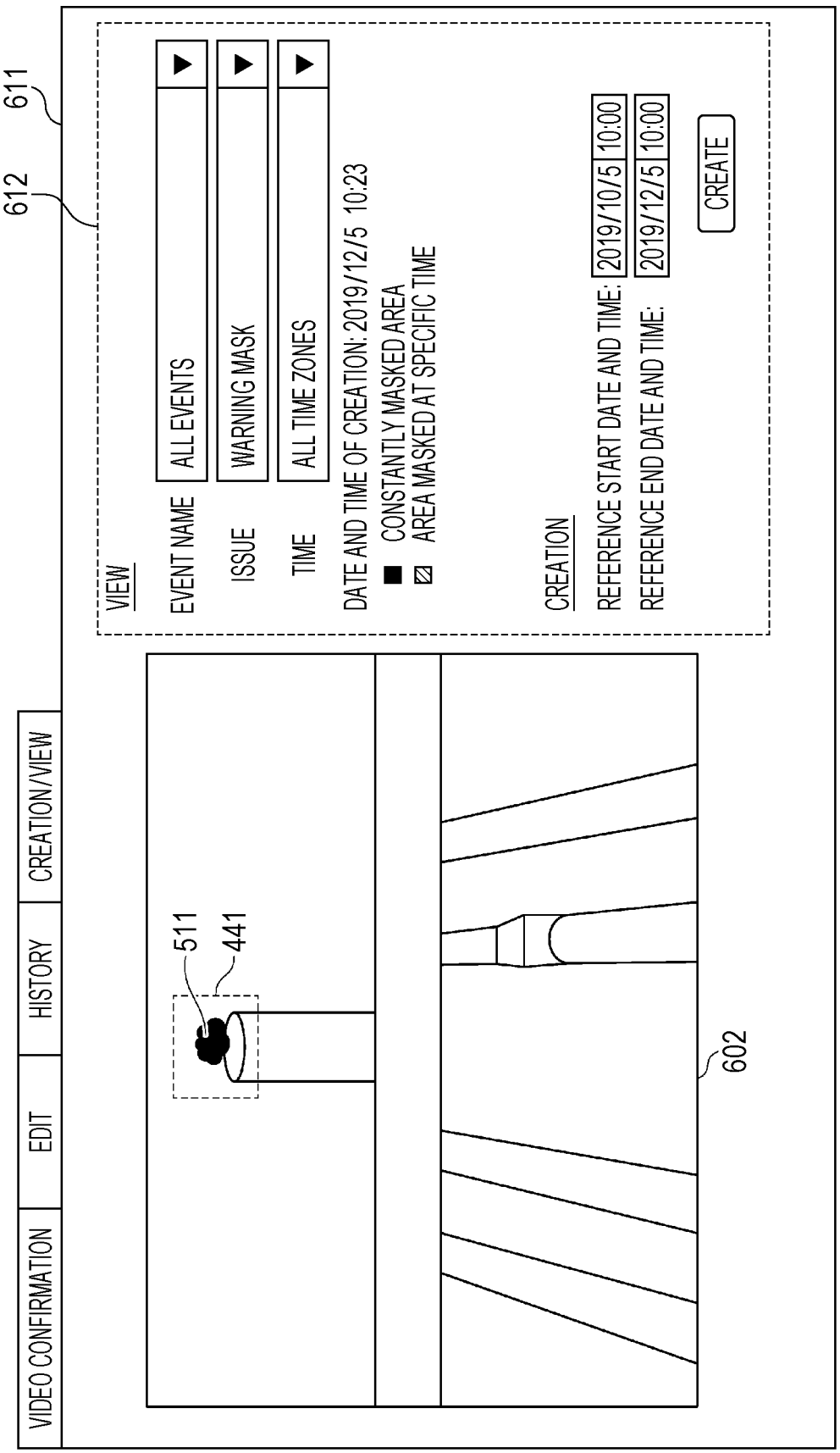
FIG. 20 is an example of a mask confirmation image in mask editing processing according to a second embodiment.

At the time of mask editing, the user selects either a caution mask or a warning mask in addition to the distinction between the user-designated mask and the statistical mask as the mask type. When the user designates the caution mask, the gas detection device does not issue a caution when the centroid of the gas region is within the caution mask. Note that, since a caution is not issued, a warning is not issued as a matter of course. When the user designates the warning mask, the gas detection device issues a caution when the centroid of the gas region is within the caution mask, but does not issue a warning even when the caution continues. FIG. 20 illustrates a state in which only a warning mask is extracted and displayed in a confirmation image of the generated mask data.

Furthermore, in the gas detection device according to the second embodiment, details of gas region notification presence/absence determination processing and notification processing are different from those of the first embodiment. Hereinafter, differences in operation will be described.

Figure 21:
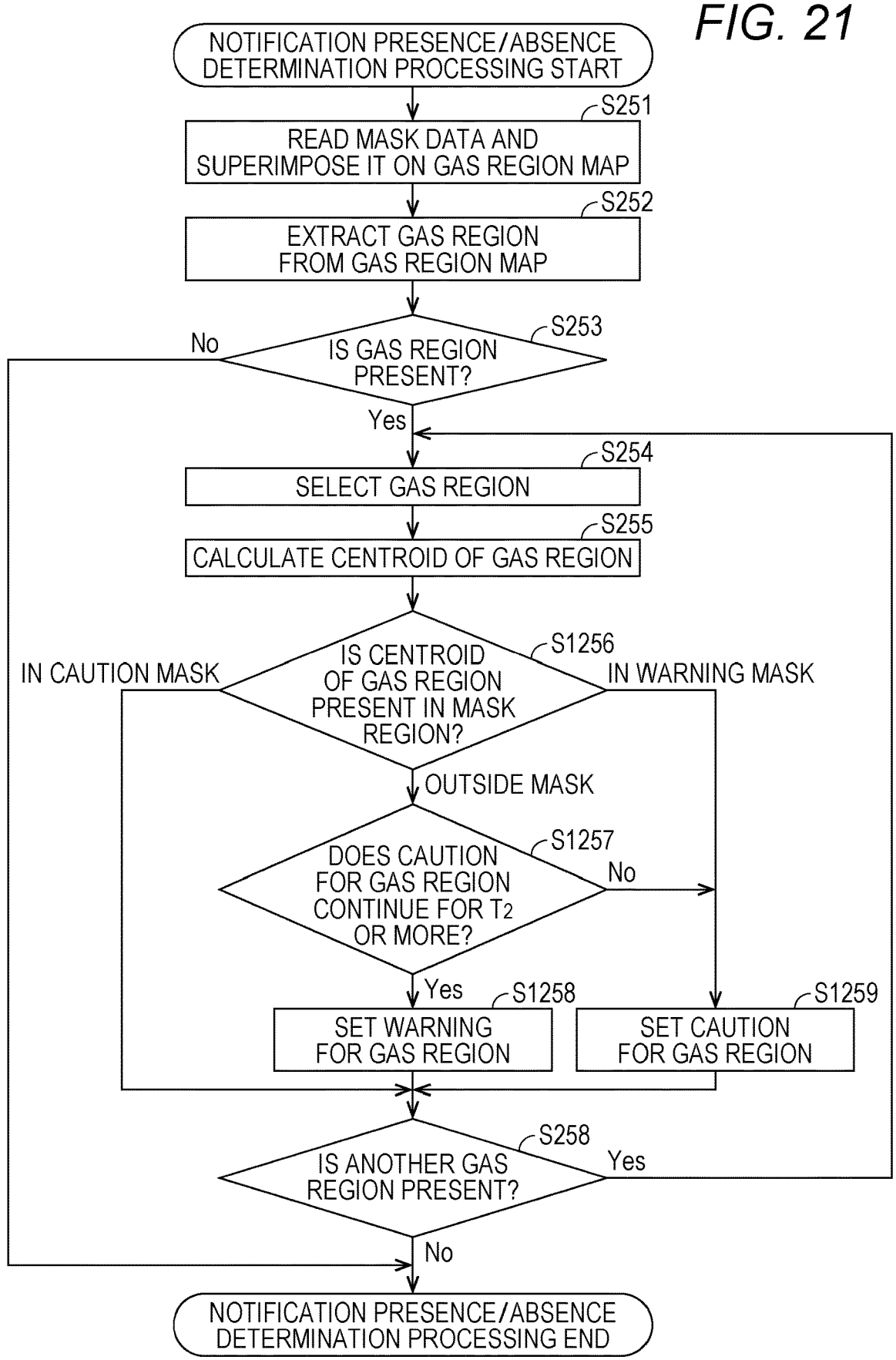
FIG. 21 is a flowchart illustrating details of gas detection notification presence/absence determination processing according to the second embodiment.

FIG. 21 is a flowchart illustrating details of the notification presence/absence determination processing according to the second embodiment.

The gas detection unit 130 acquires the mask data from the mask generation unit 170 and superimposes the mask data on the gas region map generated in step S245 (step S251).

Next, a gas region is extracted from the gas region map (step S252).

Next, it is determined whether a gas region is present (step S253). When the gas region is not present, the notification presence/absence determination processing ends. When a gas region is present, one gas region is selected (step S254), and the centroid of the gas region is calculated (step S255). Then, it is determined whether or not the calculated centroid of the gas region is present in any mask region (step S1256). When the centroid of the gas is present in the region of the caution mask, neither a caution nor a warning is issued for the mask, and thus the processing proceeds to step S258. On the other hand, when the centroid of the gas is present in the region of the warning mask, a caution is set for the gas region (step S1259). Furthermore, when the centroid of the gas is not present in the caution mask or the warning mask, it is determined whether or not the caution for the gas region continues for $T_2$ or more (step S1257). $T_2$ is a threshold value which a warning is set to be issued in a case where the caution continues for the period or longer, and is two minutes in the embodiment. The gas detection unit 130 holds the centroid position of the gas region at the time of performing step S1257, determines whether or not the gas regions are the same on the basis of the centroid positions of the gas regions in step S1257 in the next notification presence/absence determination processing, and determines that the caution is being continued when it is determined that the gas regions are the same. Note that the determination as to whether the gas regions are the same can be made on the basis of the distance between the centroid position of the gas region in step S1257 in the held previous notification presence/absence determination processing and the centroid position of the gas region of current interest. Alternatively, for example, it may be based on whether or not the centroid position of the gas region in step S1257 in the held previous notification presence/absence determination processing is within the gas region of current interest. Alternatively, for example, the position and range of the gas region may be held at the time of performing step S1257, and in step S1257 in the next notification presence/absence determination processing, determination may be made on the basis of whether or not the centroid position of the gas region of interest is within the held gas region or the overlapping rate between the gas region of interest and the held gas region. When the caution for the gas region continues for $T_2$ or more, a warning is set for the gas region (step S1258), and if not, a caution is set for the gas region (step S1259). Then, it is determined whether or not an unprocessed gas region is present (step S258), and when it is present, the processing returns to step S254.

Figure 22:
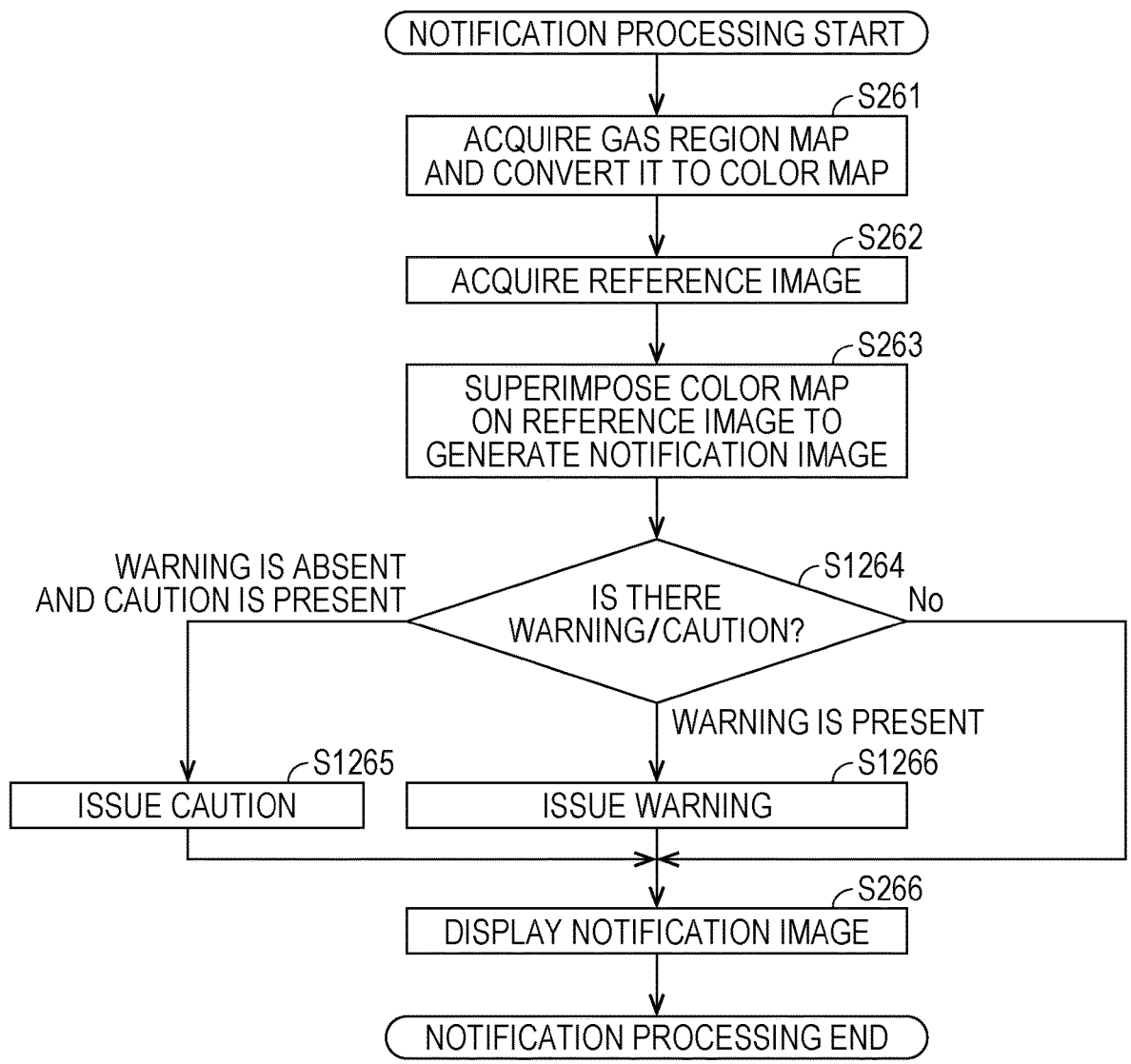
FIG. 22 is a flowchart illustrating details of notification processing according to the second embodiment.

Furthermore, FIG. 22 is a flowchart illustrating details of the notification processing according to the second embodiment.

The display control unit 180 acquires the gas region map and converts it into a color map (step S261).

Next, a reference image is acquired from the reference image acquisition unit 160 (step S262). Then, the color map is superimposed on the reference image (step S263). As a result, a notification image in which the region where the gas is detected in the reference image is colored is generated.

Next, the gas detection unit 130 is inquired whether or not a gas region for which a warning and/or a caution is set is present (step S1264). In a case where neither a warning nor a caution is set, the processing proceeds to step S266. On the other hand, when a gas region for which a warning is set is present, a warning is issued (step S1265). The warning is performed, for example, by performing one or more of changing the aspect of the notification image, turning on or blinking a warning lamp, reproducing a warning sound, and the like. On the other hand, in a case where a gas region for which a warning is set is not present and a caution is set for one or more gas regions, a caution is issued (step S1266). The caution is performed, for example, by performing one or more of changing the aspect of the notification image, turning on or blinking a caution lamp, reproducing a caution sound, and the like. Note that as a change of the aspect of the notification image, for example, a red or warning icon may be used for the warning, and a yellow or caution icon may be used for the caution.

Finally, the generated notification image is output to and displayed on the display unit 31 (step S266).

Summary

With the above configuration, in the gas detection device that performs gas detection using an image, it is possible to configure to issue a necessary warning while suppressing an unnecessary notification. In particular, in a region where unnecessary notification and necessary notification are likely to be mixed, only the caution is issued and the warning is not issued, so that it is possible to suppress the warning from being issued while calling attention to the user.

Third Embodiment

In the first and second embodiments, the user sets the user-designated mask and/or the statistical mask after a candidate of the mask region is presented to the user. However, it is sufficient that the statistical mask is based on both the candidate of the mask region by the mask candidate region extraction unit and the selection by the user, and the order may not be the first and second embodiments.

In the third embodiment, after the user sets the region for which the statistical mask is used, the region where the region and the candidate of the mask region overlap is set as the statistical mask.

Figure 23:
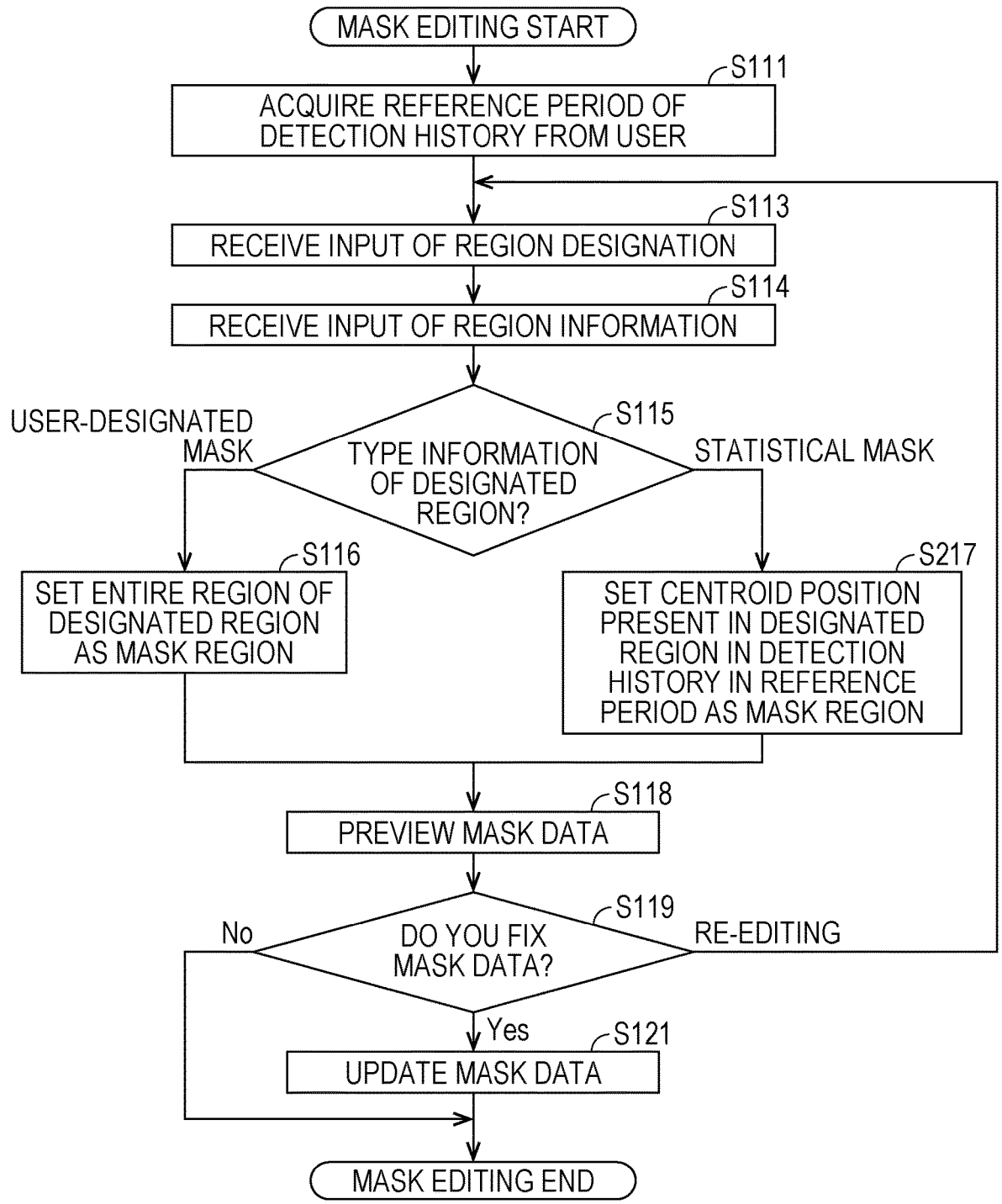
FIG. 23 is a flowchart illustrating details of mask editing processing according to a third embodiment.

FIG. 23 is a flowchart illustrating details of mask data editing processing according to the third embodiment.

First, a reference period of the detection history is acquired from the user (step S111).

Next, an input of mask region designation is received from the user (step S113). The input of the mask region designation is performed, for example, by region selection using a mouse on the reference image.

Next, an input of region information of a mask region is received from the user (step S114). The region information is, for example, information indicating whether the type of the mask of the mask region is a statistical mask or a user-designated mask.

Next, in a case where the mask type information included in the region information input from the user is the user-designated mask, all of the regions designated in step S113 are set as mask regions (step S116). On the other hand, when the mask type information is the statistical mask, a portion included in the region designated in step S113 in the centroid position based on the detection history in the reference period is set as the mask region (step S217). Specifically, a mask candidate region extraction unit 150 performs processing similar to step S112 in the first embodiment to create a gas centroid map, and sets an overlapping region between the region designated in step S113 and the centroid in the gas centroid map as a mask region.

Next, the mask data is displayed on the display unit 31 (step S118).

Next, an input as to whether or not to fix the mask data is received from the user (step S119). When the user fixes the mask data, the mask generation unit 170 holds the generated mask data as the latest mask data (step S121). Furthermore, in the embodiment, in a case where the user continues editing the mask data, the processing returns to step S113 to continue the generation of the mask data, and in a case where the user gives an instruction to discard a mask editing result, the processing ends without updating the mask data.

Summary

With the above configuration, in the gas detection device that performs gas detection using an image, it is possible to configure to perform a necessary notification of gas detection while suppressing unnecessary notification of gas detection. In particular, in a case where a region where gas detection that requires notification and gas detection that does not require notification are mixed can be specified on the basis of the reference image, a mask based on the history can be used in the region designated by the user.

Fourth Embodiment

In the first to third embodiments, the candidate of the mask region to be the original data of the statistical mask is formed on the basis of the history of the gas detection, but the candidate of the mask region may be created using additional information in addition to the history of the gas detection.

In the fourth embodiment, the candidate of the mask region is formed by an AI mask as a machine learning model created by the notification necessity information input by the user with respect to the history of the gas detection.

Hereinafter, a method of creating and learning the AI mask will be described.

Figure 25:
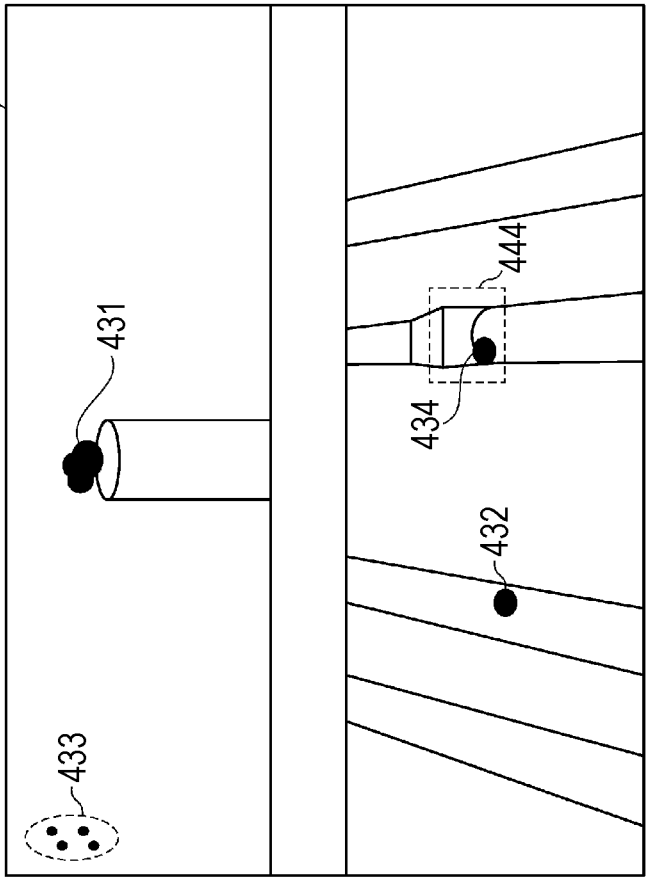
FIG. 25 is an input example of an AI mask region in mask editing processing according to the fourth embodiment.
Figure 26:
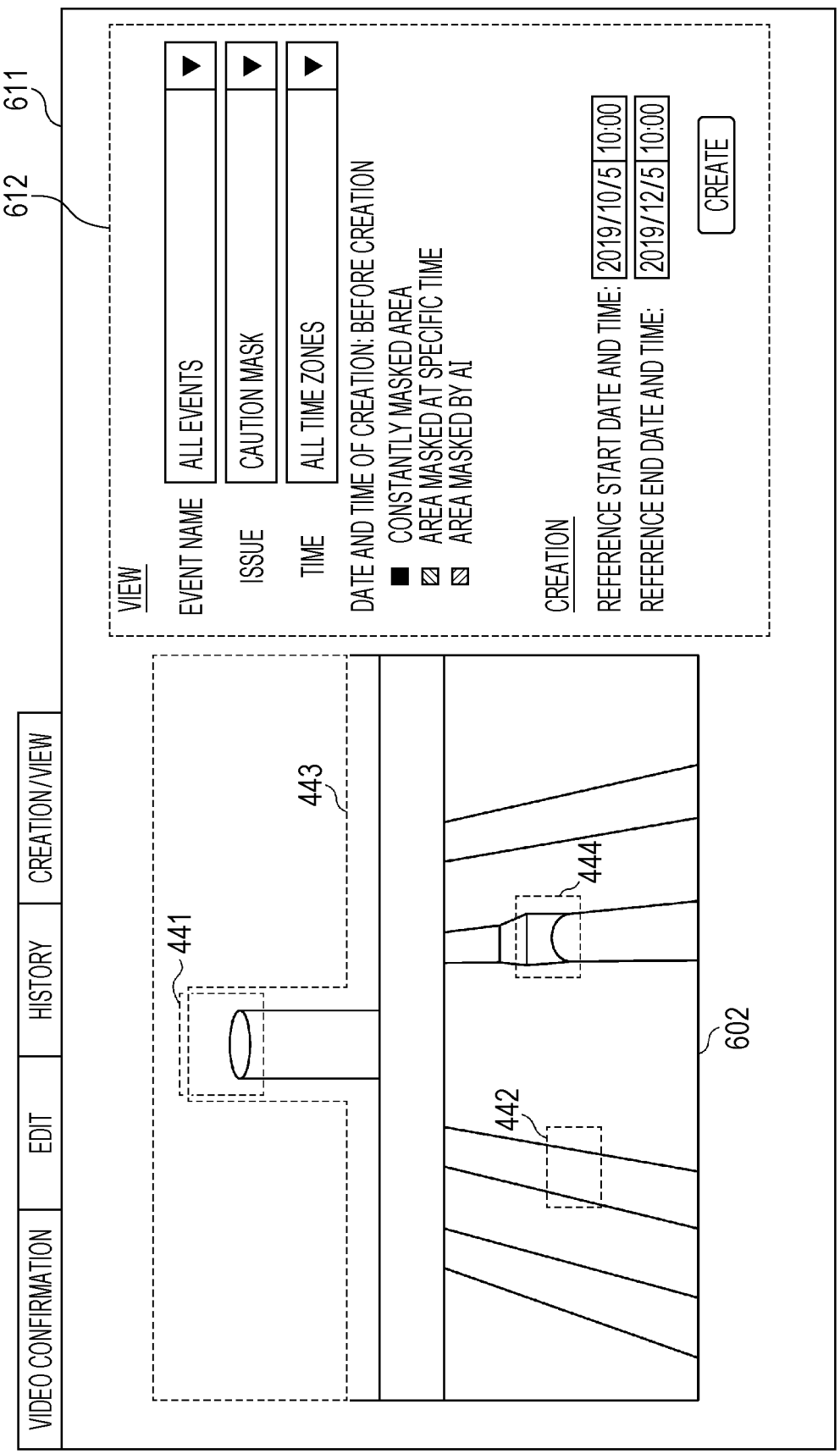
FIG. 26 is an example of a mask confirmation image in the mask editing processing according to the fourth embodiment.
Figure 27:
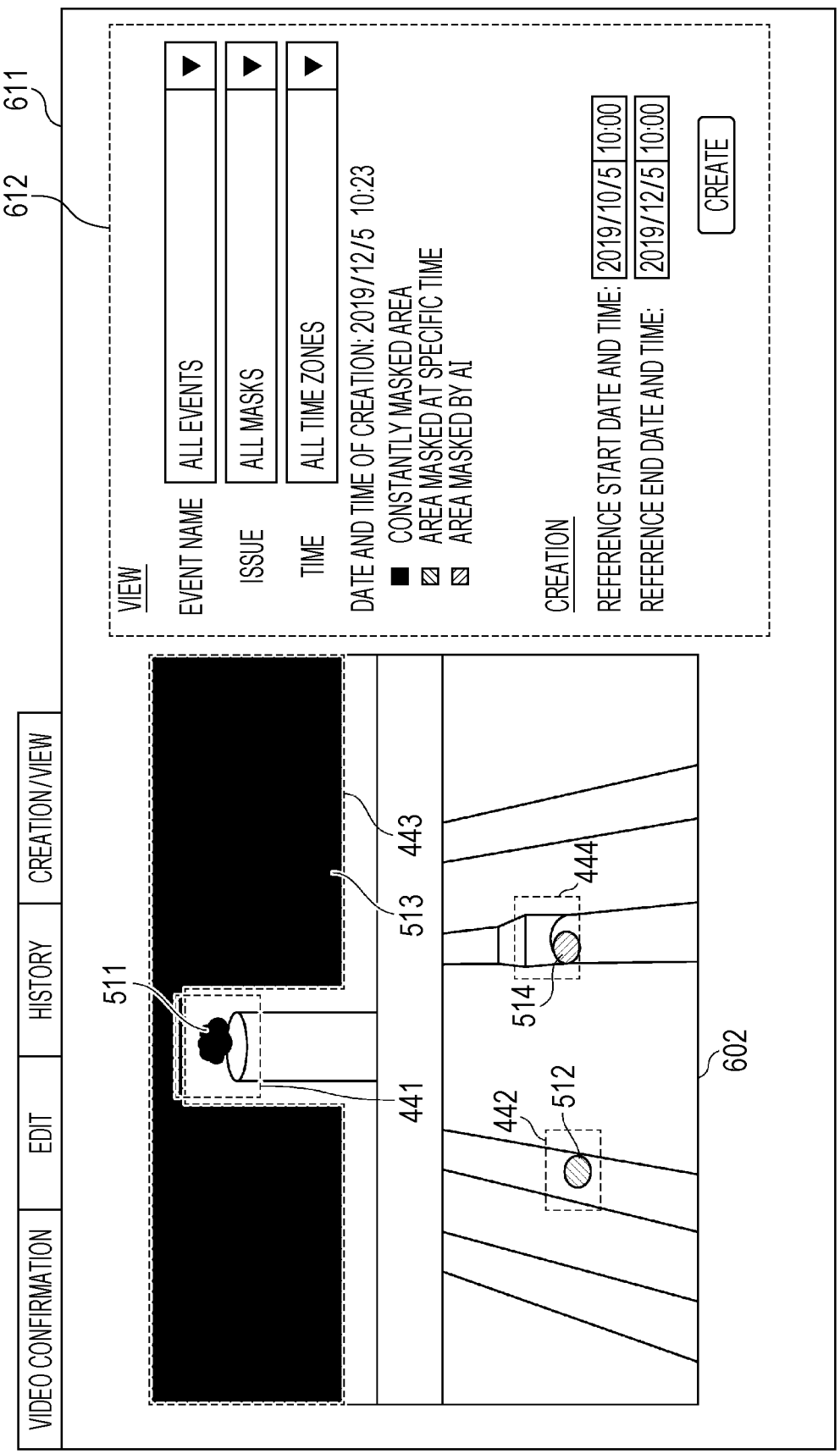
FIG. 27 is an example of a mask confirmation image in the mask editing processing according to the fourth embodiment.
Figure 28:
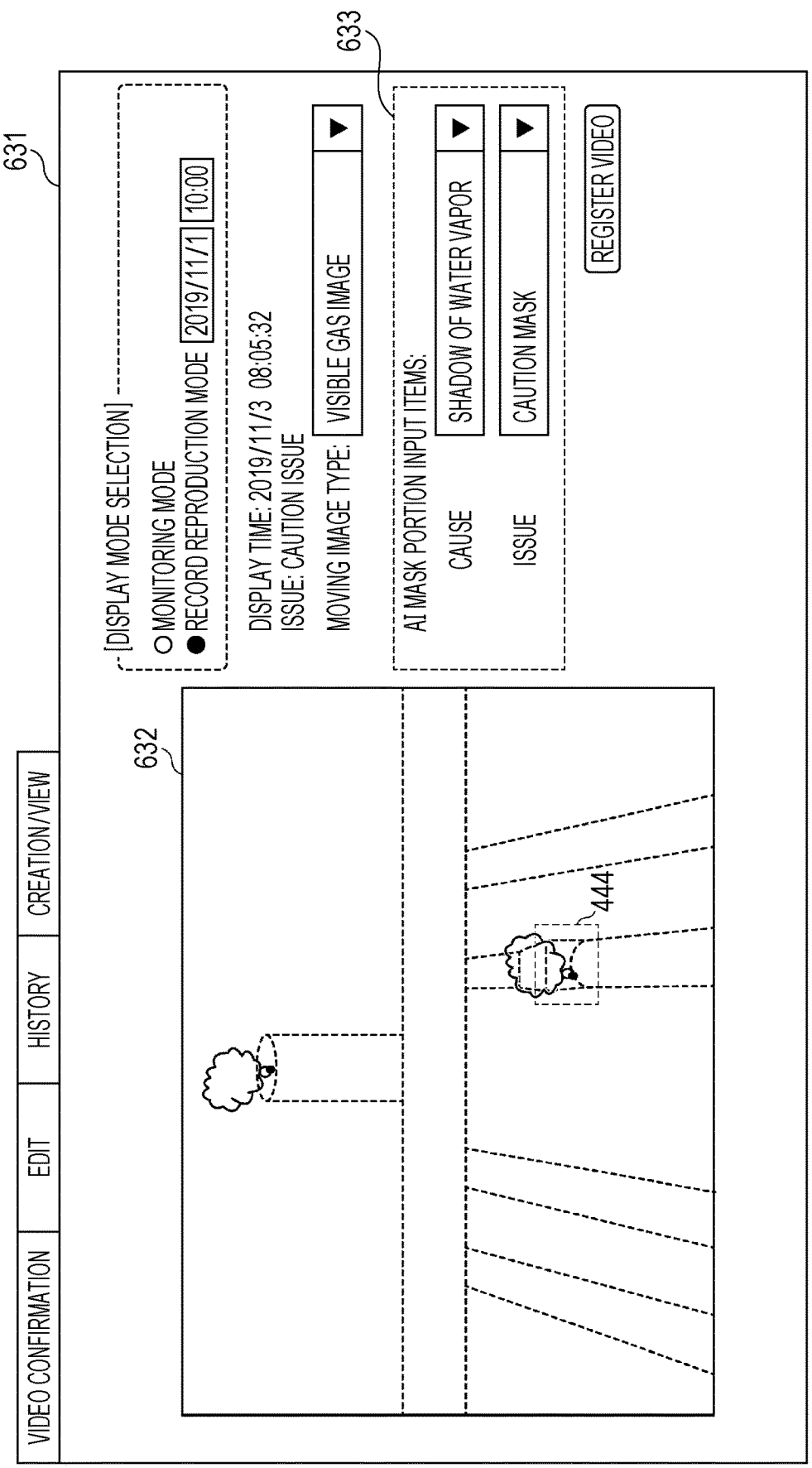
FIG. 28 is an input example of the AI mask region in the mask editing processing according to the fourth embodiment.
Figure 29:
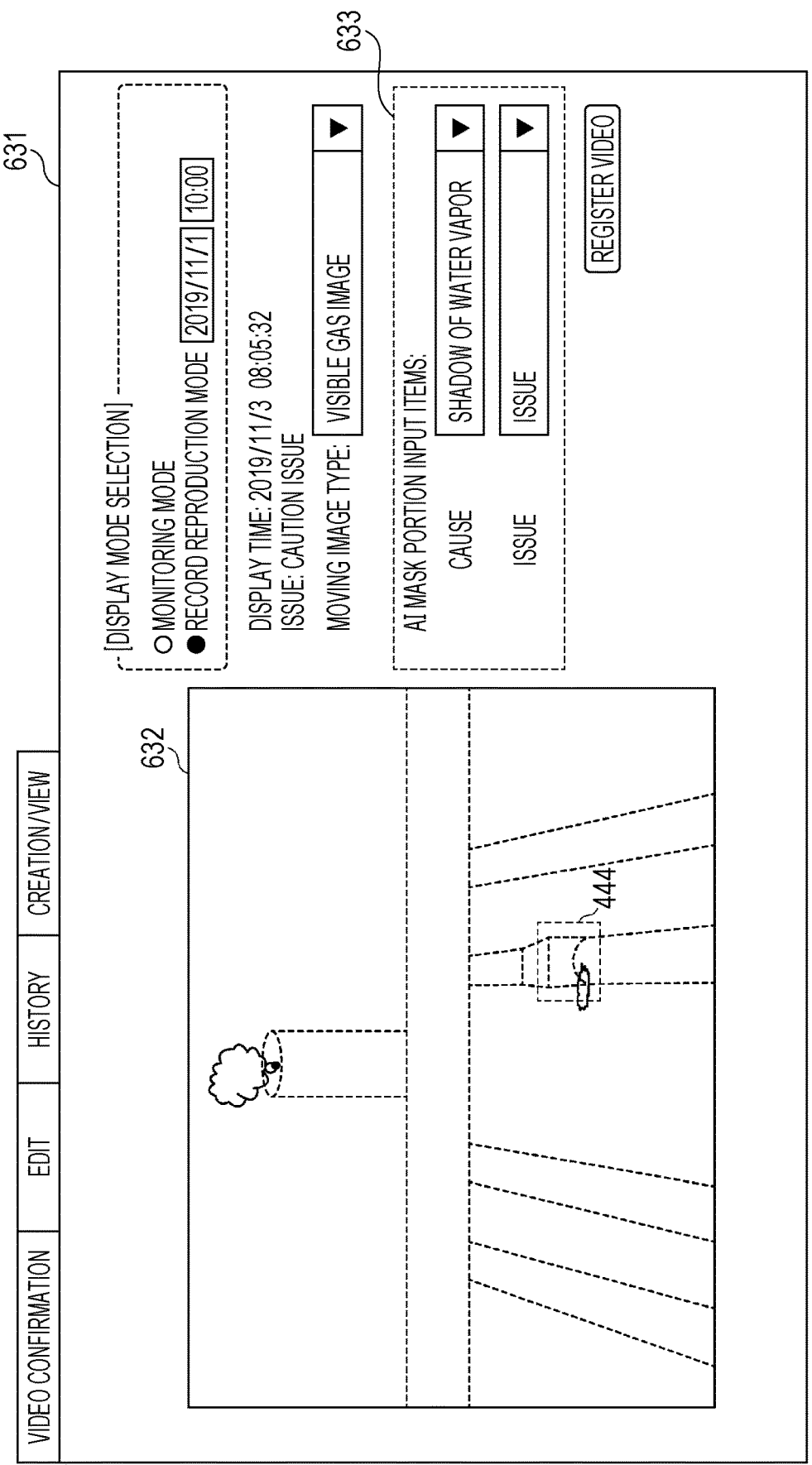
FIG. 29 is an input example of the AI mask region in the mask editing processing according to the fourth embodiment.

FIG. 24 is an example of the screen 601 indicating mask candidate region data created by the mask candidate region extraction unit 150, and sets of centroids 431, 432, 433, and 434 of the gas regions are displayed. On the other hand, FIG. 25 illustrates a state in which the user selects a region 444 including the set of centroids 434 and inputs the AI mask in the input field 604. FIGS. 26 and 27 are images indicating the state of the mask, and are an image indicating a region input by the user and an image indicating a mask region, respectively. Here, the AI mask region 444 is not immediately caused to function as a mask with respect to a centroid region 514, and in a case where there is gas detection in the region 444, notification of the gas detection is performed. On the other hand, in a case where there is gas detection in the region 444 designated as AI in the monitoring mode, the user registers the cause of the gas detection and the type of the mask as indicated in an input portion 633 in FIGS. 28 and 29. Through this processing, the gas detection device performs machine learning as to whether the user requires or does not require a notification of gas detection on the basis of information of the shape of the detected gas region and a difference in characteristics (shading pattern, average density, or the like) of an image processed from an infrared image. That is, a mask that does not mask the gas detection for which the user requires notification and masks the gas detection for which the user does not require notification is generated by machine learning. Therefore, after learning can be performed by the input from the user, the mask processing is performed according to the intention of the user. As the machine learning, for example, a neural network can be used, and more specifically, for example, a multilayered CNN can be used. Note that not only a still image but also a moving image including a plurality of frames can be used as the data of the machine learning, and 3D CNN may be used. Furthermore, additional information such as temperature, humidity, and time may be used as the data of the machine learning.

With the above configuration, in the gas detection device that performs gas detection using an image, it is possible to configure to perform a necessary notification of gas detection while suppressing unnecessary notification of gas detection. In particular, by using machine learning for a region where gas detection that requires notification and gas detection that does not require notification are mixed, it is possible to generate an accurate mask as a result of the user's input.

Fifth Embodiment

In the first embodiment, after the gas detection device presents the candidate of the statistical mask based on the detection history to the user, the user determines the mask region, but, similarly, in a case where the AI mask described in the fourth embodiment is used, after the gas detection device presents the candidate of the AI mask based on the machine learning to the user, the user may determine whether to adopt the mask.

Specifically, the mask candidate region data as an AI mask based on the machine learning is presented to the user. Then, the user selects whether or not to set each of the regions indicated in the mask candidate region data as a mask region by designating a region including the mask candidate. That is, a mask including a region selected by the user as a mask among candidate regions of the AI mask based on machine learning is generated. The selection of the mask setting may be a direct selection instruction or the like to the mask candidate region instead of region designation.

Note that the background region such as sky, sea, or grass field may be presented to the user as mask candidate region data without using machine learning by using color information, texture information, or the like of the reference image (visible light image).

With the above configuration, in the gas detection device that performs gas detection using an image, it is possible to configure to perform a necessary notification of gas detection while suppressing unnecessary notification of gas detection. In particular, it is possible to create a mask desired by the user with a simple input on the basis of machine learning of a region where gas detection that requires notification and gas detection that does not require notification are mixed.

OTHER MODIFICATIONS ACCORDING TO EMBODIMENTS (1) In the first embodiment, the information indicating which of the user-designated mask and the statistical mask is used as the mask region information, and in the first modification, the mask application time is further added, and in the second embodiment, the information indicating which of the warning mask and the caution mask is used is further added. However, the mask region information is not limited to the above, and arbitrary information may be added. Examples of the mask region information include outline information of the mask, a reason for performing the mask such as a reason for detecting the gas region, a creation date and time of the mask, a creator of the mask, and the like. In this way, it is easy for a user other than the mask creator to understand the mask setting intention.

Figure 30:
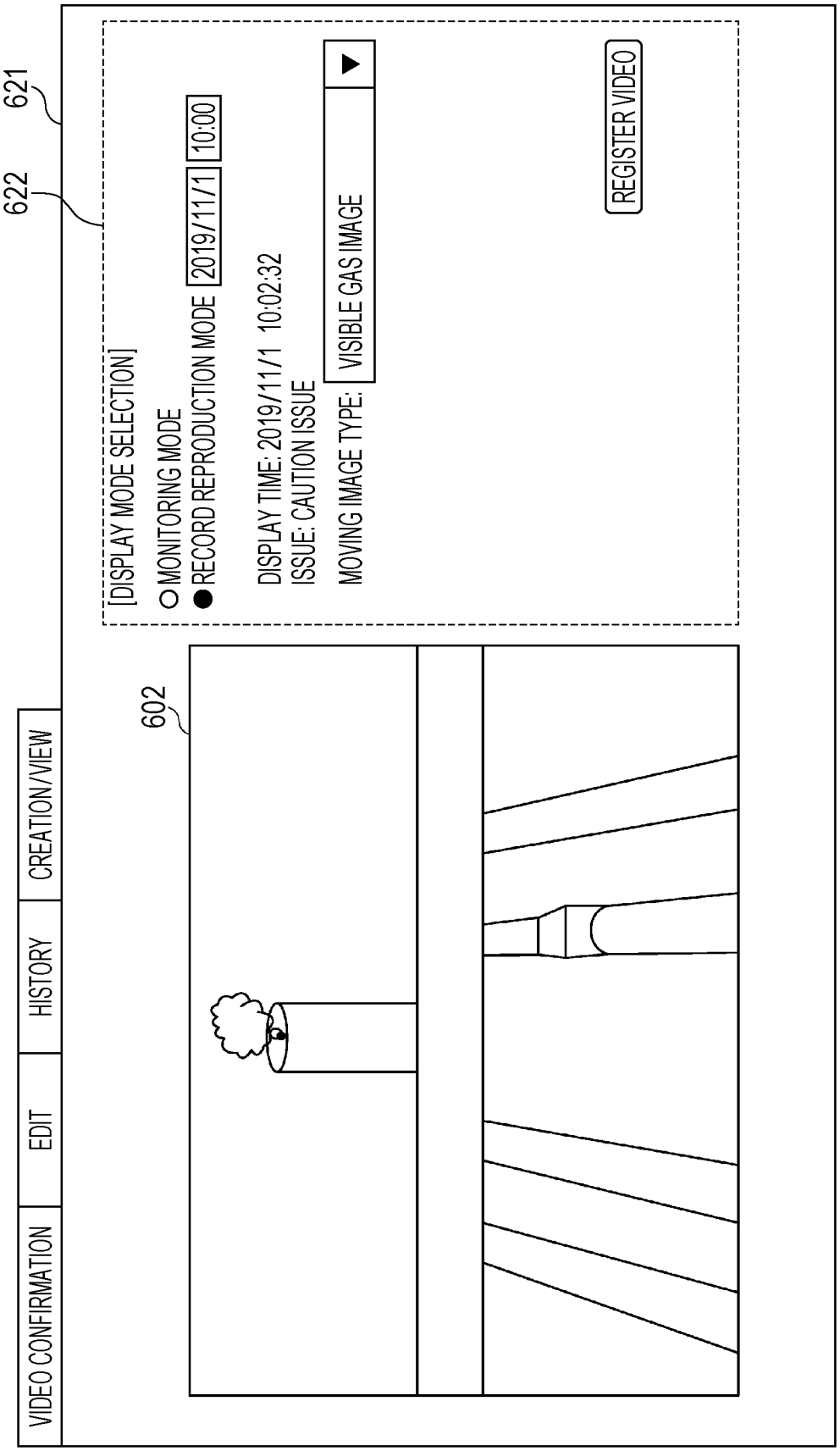
FIG. 30 is an example of a mask region information registration screen in mask editing processing according to a modification.
Figure 31:
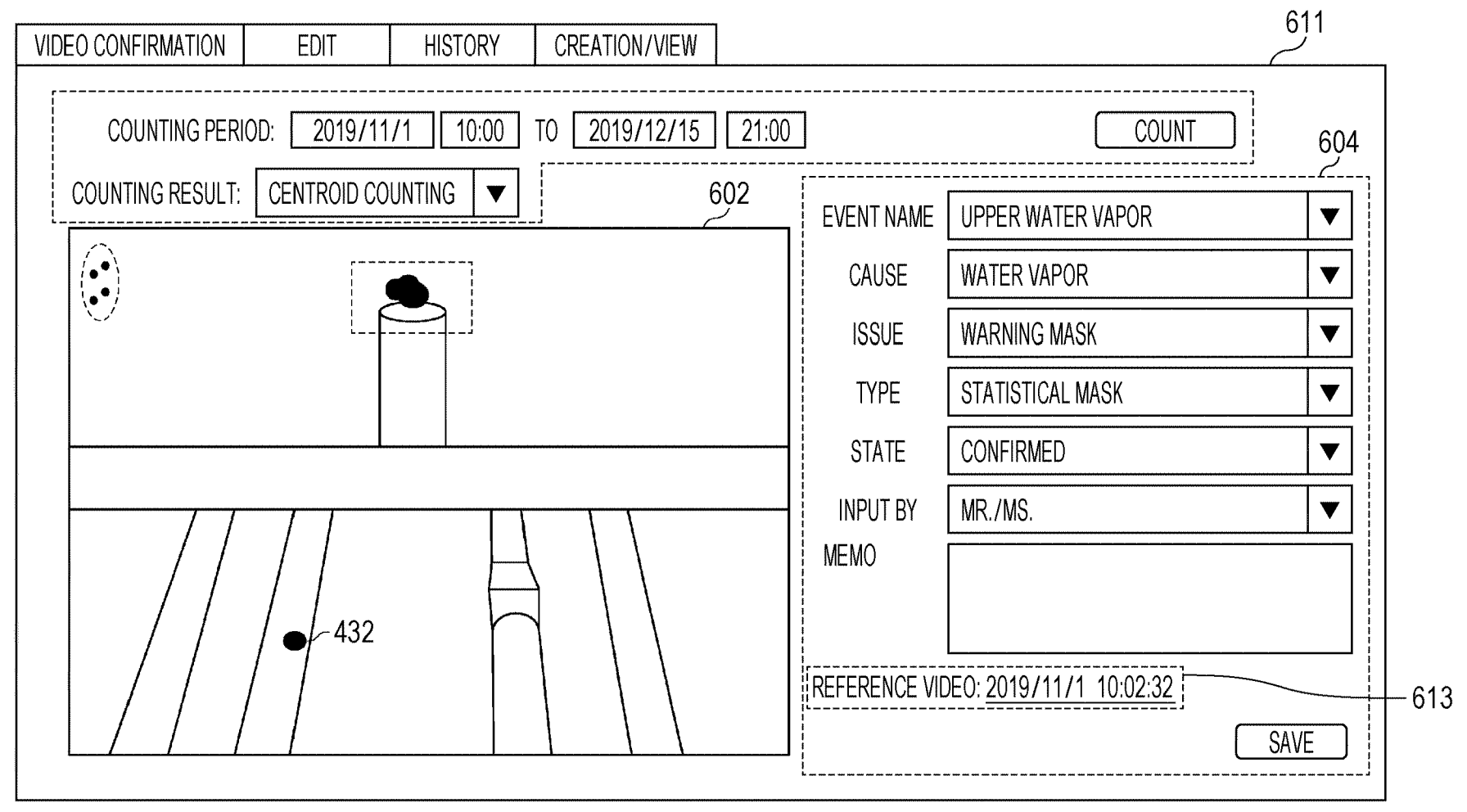

Furthermore, as the mask region information, a detection image at the time of gas region detection, a reference image, or an image in which the gas region is superimposed on the reference image may be used. FIG. 30 is a display example of a screen for registering an image in which a gas region at the time of gas region detection is superimposed on a reference image as mask region information, and FIG. 31 illustrates a state in which an image is registered as a part of the mask region information. In this way, a user other than the mask creator can easily determine whether the set mask region has been appropriately set.

Moreover, in mask editing, a history of mask editing processing may be made possible. FIG. 32 illustrates a state in which a mask edit history is displayed in the mask editing processing. In this way, it is possible to check whether the mask is appropriate by collating the history of gas detection with the mask editing history.

(2) In each embodiment and modification, the gas detection device 100 operates in either the gas detection mode or the mask editing mode, but the gas detection device 100 may independently operate in the mask editing mode while continuing the gas detection mode. In this case, for example, in the gas detection mode, a new mask may be used in the notification presence/absence determination processing that is executed first after the mask data is updated.

(3) In each embodiment and modification, when the statistical mask is used, the statistical mask is created on the basis of the gas detection history in the period designated at the time of creating the mask. However, for example, the user may input data indicating whether the notification is necessary or unnecessary with respect to the notification of gas detection, and the gas detection device may create the statistical mask on the basis of the history of only the gas notification for which the notification is unnecessary. This makes it possible to prevent suppression of necessary gas notification.

(4) In each embodiment and modification, the input of the region designation is received after the centroid position is displayed on the basis of the detection history in the mask editing processing, but, the input of which of the user-designated mask and the statistical mask is set may be first received, and the region designation may be received without using the history when the user-designated mask is designated.

(5) In each embodiment and modification, the mask editing processing is performed according to a user's instruction. However, for example, the statistical mask may be configured to be automatically updated periodically. Specifically, when the user designates the statistical mask region at the time of mask generation, the mask generation unit may hold the region designated by the user and periodically update the statistical mask for the region according to the latest gas detection history.

(6) In each embodiment and modification, the gas is detected on the basis of a time-series change in the pixel value at the detection point provided in the detection image, but it is not limited thereto, and any method of detecting the gas on the basis of the detection image may be used. Furthermore, the centroid of the gas region is not limited to the above, and may be arbitrary, for example, the center of a circumscribed circle, the lowermost position in the vertical direction in the gas region, or the like. Furthermore, the mask may be created on the basis of the time of being inside the gas region during the reference period in each pixel without using the centroid position. In this case, in step S256, it is sufficient if the proportion of the gas region of interest present in the mask region may be calculated, and when the proportion is equal to or greater than a predetermined threshold value (for example, 70%), it is determined that the notification is not made.

(7) In each embodiment and modification, the detection image is an infrared image having a wavelength of 3.2 to 3.4 μm, but it is not limited thereto, and any image such as an infrared image, a visible image, or an ultraviolet image in another wavelength range may be used as long as the presence of the gas to be detected can be confirmed. Furthermore, the method of detecting the gas region is not limited to the above-described method, and may be any processing capable of detecting the gas region. Moreover, when the detection image is an image of visible light, the detection image may be used as the reference image without separately acquiring the reference image.

(8) Note that although the present invention has been described on the basis of the above embodiments, the present invention is not limited to the above embodiments, and the cases described below are also included in the present invention.

For example, in the present invention, a server device or a terminal device may be a device in which field programmable gate array (FPGA) or an application specific integrated circuit (ASIC) is used as a processor. Furthermore, the server device and the terminal device may be realized as a single device.

Furthermore, some or all of the components constituting each of the above-described devices include one system large scale integration (LSI). The system LSI is a super multifunctional LSI manufactured by integrating a plurality of constituent units on one chip, and is specifically a computer system including a microprocessor, ROM, RAM, and the like. These may be individually integrated into one chip, or may be integrated into one chip so as to include a part or all of them. Note that an LSI may be called an IC, a system LSI, a super LSI, or an ultra LSI depending on difference in degree of integration. The RAM stores a computer program for achieving the same operation as each of the above devices. The microprocessor operates in accordance with the computer program, whereby the system LSI achieves its functions. For example, a case where a user assistance method of the present invention is stored as an LSI program, the LSI is inserted into a computer, and a predetermined program is executed is also included in the present invention.

Note that the manner of an integrated circuit is not limited to an LSI, but may be achieved by a dedicated circuit or a general-purpose processor. After the LSI is manufactured, an FPGA, which is programmable, or a reconfigurable processor that is reconfigurable for connection or setting of a circuit cell in an LSI may be used.

Moreover, when an integrated circuit technology that replaces the LSI turns into reality because of progress of semiconductor technology or by a derived, different technology, of course, integration of a functional block may be performed using such technology.

In the gas detection device according to the embodiments, the image holding unit and the detection history holding unit are configured to be included in the gas detection device, but it is not limited thereto, and the image holding unit may be configured such that semiconductor memory, a hard disk drive, an optical disk drive, a magnetic storage device, or the like is externally connected to the gas detection device. Furthermore, a server computer having the function of a database server may be configured to be included in the gas detection system as the detection history holding unit independently of the gas detection device.

Furthermore, the division of the functional blocks in the block diagram is an example, and a plurality of functional blocks may be realized as one functional block, one functional block may be divided into a plurality of functional blocks, or some functions may be transferred to another functional block. Furthermore, functions of a plurality of functional blocks having similar functions may be processed in parallel or in a time division manner by single hardware or software.

Furthermore, the order in which the above steps are executed is for specifically describing the present invention, and may be an order other than the above order. Furthermore, some of the above steps may be executed simultaneously (in parallel) with other steps.

Furthermore, at least some of the functions of the gas detection system according to each embodiment and the modifications thereof may be combined. Further, the numbers used above are all illustrated to specifically describe the present invention, and the present invention is not limited to the illustrated numbers.

Moreover, the present invention also includes various modifications in which the present embodiment is modified within the scope conceived by those skilled in the art.

Summary (1) A gas detection device according to an aspect of the present disclosure is a gas detection device that gives a notification of a detected gas on the basis of a captured image obtained by capturing an image of a monitoring target, the gas detection device including: a gas detection unit that detects gas on the basis of the captured image and gives a notification of the detected gas; an input unit that receives input information from a user; a mask candidate region extraction unit that extracts a mask candidate region that is a candidate region of a mask region for which a notification of gas detection is suppressed; and a mask generation unit that generates mask data indicating the mask region, in which the gas detection unit gives a notification of a gas detected outside the mask region, and the mask generation unit generates, as the mask data, a region in which first mask candidate region information input from the input unit matches second mask candidate region information extracted by the mask candidate region extraction unit.

Furthermore, a gas detection method according to an aspect of the present disclosure is a gas detection method that gives a notification of a detected gas on the basis of a captured image obtained by capturing an image of a monitoring target, the gas detection method including: detecting gas on the basis of the captured image and giving a notification of the detected gas; receiving input information from a user; extracting a mask candidate region that is a candidate region of a mask region for which a notification of gas detection is suppressed; generating mask data indicating the mask region; giving a notification of a gas detected outside the mask region in notification of the detected gas; and in generation of the mask data, generating, as the mask data, a region in which first mask candidate region information included in the input information matches extracted second mask candidate region information.

Furthermore, a program according to an aspect of the present disclosure is a program causing a computer to perform gas detection processing that gives a notification of a detected gas on the basis of a captured image obtained by capturing an image of a monitoring target, the gas detection processing including: detecting gas on the basis of the captured image and giving a notification of the detected gas; receiving input information from a user; extracting a mask candidate region that is a candidate region of a mask region for which a notification of gas detection is suppressed; generating mask data indicating the mask region; giving a notification of a gas detected outside the mask region in notification of the detected gas; and in generation of the mask data, generating, as the mask data, a region in which first mask candidate region information included in the input information matches the extracted second mask candidate region information.

Furthermore, a program according to an aspect of the present disclosure is a program causing a computer to perform gas detection processing that gives a notification of a detected gas on the basis of a captured image obtained by capturing an image of a monitoring target, the gas detection processing including: detecting gas on the basis of the captured image and giving a notification of the detected gas; receiving input information from a user; extracting a mask candidate region that is a candidate region of a mask region for which a notification of gas detection is suppressed; generating mask data indicating the mask region; giving a notification of a gas detected outside the mask region in notification of the detected gas; and in generation of the mask data, generating, as the mask data, a region in which first mask candidate region information included in the input information matches the extracted second mask candidate region information.

According to the above configuration, method, or program, a region in which a first mask candidate region input from the user matches an extracted second mask candidate region is used as the mask. Therefore, it is possible to suppress the notification of gas detection for gas detection for which the user has determined that notification is unnecessary and to give a notification of gas detection for gas detection for which the user has determined that notification is necessary among the mask candidate regions extracted by the mask candidate region extraction unit. As a result, it is possible to achieve both suppression of unnecessary notification of gas detection and necessary notification of gas detection.

(2) A gas detection device according to another aspect of the present disclosure is a gas detection device that gives a notification of a detected gas on the basis of a captured image obtained by capturing an image of a monitoring target, the gas detection device including: a gas detection unit that detects gas on the basis of the captured image and gives a notification of the detected gas; an input unit that receives input information from a user; a mask candidate region extraction unit that extracts a mask candidate region that is a candidate region of a mask region for which a notification of gas detection is suppressed; and a mask generation unit that generates mask data indicating the mask region, in which the gas detection unit gives a notification of a gas detected outside the mask region, the mask region includes a first region and a second region, and the mask generation unit generates a region set only by user designation input by the input unit as mask data of the first region, and generates, as the mask data of the second region, a region in which first mask candidate region information input from the input unit matches second mask candidate region information extracted by the mask candidate region extraction unit.

A gas detection method according to another aspect of the present disclosure is a gas detection method that gives a notification of a detected gas on the basis of a captured image obtained by capturing an image of a monitoring target, the gas detection method including: detecting gas on the basis of the captured image and giving a notification of the detected gas; receiving input information from a user; extracting a mask candidate region that is a candidate region of a mask region for which a notification of gas detection is suppressed; generating mask data indicating the mask region; giving a notification of a gas detected outside the mask region in notification of the detected gas, the mask region including a first region and a second region; and generating a region set only by user designation included in the received input information as mask data of the first region in creation of the mask data, and generating, as the mask data of the second region, a region in which first mask candidate region information included in the received input information matches the extracted second mask candidate region information.

A program according to another aspect of the present disclosure is a program causing a computer to perform gas detection processing that gives a notification of a detected gas on the basis of a captured image obtained by capturing an image of a monitoring target, the gas detection processing including; detecting gas on the basis of the captured image and giving a notification of the detected gas; receiving input information from a user; extracting a mask candidate region that is a candidate region of a mask region for which a notification of gas detection is suppressed; generating mask data indicating the mask region; giving a notification of a gas detected outside the mask region in notification of the detected gas, the mask region including a first region and a second region; and generating a region set only by user designation included in the received input information as mask data of the first region in creation of the mask data, and generating, as the mask data of the second region, a region in which first mask candidate region information included in the received input information matches the extracted second mask candidate region information.

According to the above configuration, method, or program, a region in which a first mask candidate region input from the user matches an extracted second mask candidate region is used as the mask. Therefore, it is possible to suppress the notification of gas detection for gas detection for which the user has determined that notification is unnecessary and to give a notification of gas detection for gas detection for which the user has determined that notification is necessary among the mask candidate regions extracted by the mask candidate region extraction unit. Moreover, the user can also use a region not included in the second mask candidate region as a mask as the first region. As a result, it is possible to achieve both suppression of unnecessary notification of gas detection and necessary notification of gas detection.

(3) Furthermore, in the gas detection device according to (1) or (2), the mask candidate region extraction unit may extract the mask candidate region using past detection information.

According to the above configuration, since the region where the detection of the gas is repeated can be extracted as the mask candidate region, the mask candidate region can be appropriately extracted on the basis of the gas detection history.

(4) Furthermore, in the gas detection device according to (1) or (2), the mask candidate region extraction unit may extract the mask candidate region by performing machine learning on past detection information and information input from the input unit as to whether or not to suppress notification of gas detection.

According to the above configuration, only the region for which the notification should be suppressed can be extracted as the mask candidate region on the basis of the history of detection that requires notification and the history of detection that does not require the notification, so that the mask candidate region can be more appropriately extracted.

(5) Furthermore, in the gas detection device according to (1) to (4), the mask generation unit may generate the mask data for the mask candidate region extracted by the mask candidate region extraction unit using a region matching a region input by a user as the mask region.

According to the above configuration, the user can easily designate the mask region on the basis of the mask candidate region.

(6) Furthermore, in the gas detection device according to (1) to (4), the mask generation unit may generate the mask data for a region input by the input unit by a user using the mask candidate region extracted by the mask candidate region extraction unit as the mask region.

According to the above configuration, the mask candidate region can be set for the region that the user thinks that the mask region should be present.

(7) Furthermore, in the gas detection device according to (1) to (6), the mask candidate region extraction unit may hold a gas detection position by the gas detection unit and information regarding the detection in association with each other.

According to the above configuration, since the mask candidate region can be set using not only whether gas has been detected but also information regarding gas detection, it is possible to suppress notification of only gas detection that does not require notification.

(8) Furthermore, in the gas detection device according to (7), the information regarding the detection may include information indicating whether or not a notification of the detection is to be given.

According to the above configuration, since the mask candidate region can be set using only gas detection that does not require notification, it is possible to more efficiently suppress notification of gas detection that does not require notification.

(9) Furthermore, in the gas detection device according to (8), the information indicating whether or not a notification of the detection is to be given may be an event that has caused the detection.

According to the above configuration, the user can confirm the validity of the mask candidate region, and it is easy to verify whether the notification of gas detection that requires notification is not suppressed.

(10) Furthermore, in the gas detection device according to (7), the information regarding detection of the gas may be an image obtained by capturing an image of a monitoring target at a time of the detection.

According to the above configuration, the user can confirm the validity of the mask candidate region, and it is easy to verify whether the notification of gas detection that requires notification is not suppressed.

(11) Furthermore, in the gas detection device according to (1) to (10), the mask generation unit may use a detected gas leakage position or a representative position of a detected gas region as a detection position by the gas detection unit.

According to the above configuration, in the determination of whether or not a notification of the detected gas should be given, the processing can be performed on the basis of the position instead of the gas region, so that the reduction of the calculation amount is achieved.

(12) Furthermore, in the gas detection device according to (1) to (11), a notification by the gas detection unit may include a first notification issued for gas detection and a second notification issued for a frequency of gas detection, and the mask data may include a first mask for suppressing the first notification and a second mask for suppressing the second notification.

According to the above configuration, it is possible to change the aspect of the notification between the gas detection that occurs infrequently and the gas detection that occurs frequently, and it is possible to selectively use a mask suitable for each case.

(13) Furthermore, in the gas detection device according to (1) to (12), the mask data may include a time-designated mask valid only at a predetermined time.

According to the above configuration, it is possible to suppress gas notification that does not require notification and occurs only at a specific time.

INDUSTRIAL APPLICABILITY

The gas detection device, gas detection method, and program according to the present disclosure are useful as a gas detection system capable of giving a necessary notification of gas detection while suppressing an unnecessary notification of gas detection.

REFERENCE SIGNS LIST

1000 Gas detection system
100 Gas detection device
110 Detection image acquisition unit
120 Image holding unit
130 Gas detection unit
140 Detection history holding unit
150 Mask candidate region extraction unit
160 Reference image acquisition unit
170 Mask generation unit
180 Display control unit
190 Control unit
20 Image acquisition means
21 Detection image generation unit
22 Reference image generation unit
31 Display unit
32 Input unit

The invention claimed is:

1. A gas detection device that gives a notification of a detected gas on a basis of a captured image obtained by capturing an image of a monitoring target, the gas detection device comprising:
   a gas detector that detects gas on a basis of the captured image and gives a notification of the detected gas;
   an inputter that receives input information including first mask candidate region information from a user, the first mask candidate region information indicating a first mask candidate region that is a candidate region of a mask region for which a notification of gas detection is suppressed;
   a mask candidate region extractor that extracts a second mask candidate region that is a candidate region of a mask region for which a notification of gas detection is suppressed; and
   a mask generator that generates mask data indicating the mask region,
   wherein
   the gas detector gives a notification of a gas detected outside the mask region, and
   the mask generator
      determines a region in which the first mask candidate region for which the notification of gas detection is suppressed matches the second mask candidate region for which the notification of the gas detection is suppressed; and
      generates the mask data based on the determined region.

2. A gas detection device that gives a notification of a detected gas on a basis of a captured image obtained by capturing an image of a monitoring target, the gas detection device comprising:
   a gas detector that detects gas on a basis of the captured image and gives a notification of the detected gas;

an inputter that receives input information including first mask candidate region information from a user, the first mask candidate region information indicating a first mask candidate region that is a candidate region of a mask region for which a notification of gas detection is suppressed;

a mask candidate region extractor that extracts a second mask candidate region that is a candidate region of a mask region for which a notification of gas detection is suppressed; and a mask generator that generates mask data indicating the mask region, wherein the gas detector gives a notification of a gas detected outside the mask region, the mask region includes a first region and a second region, and the mask generator
generates a region set only by user designation input by the inputter as mask data of the first region,
determines a region in which the first mask candidate region for which the notification of gas detection is suppressed matches the second mask candidate region for which the notification of the gas detection is suppressed, and
generates the mask data of the second region based on the determined region.

3. The gas detection device according to claim 1, wherein the mask candidate region extractor extracts the second mask candidate region using past detection information.

4. The gas detection device according to claim 1, wherein the mask candidate region extractor extracts the second mask candidate region by performing machine learning on past detection information and information input from the inputter as to whether or not to suppress notification of gas detection.

5. The gas detection device according to claim 1, wherein the mask generator generates the mask data for the second mask candidate region extracted by the mask candidate region extractor using a region matching a region input by a user as the mask region.

6. The gas detection device according to claim 1, wherein the mask generator generates the mask data for a region input by the inputter by a user using the second mask candidate region extracted by the mask candidate region extractor as the mask region.

7. The gas detection device according to claim 1, wherein the mask candidate region extractor holds a gas detection position by the gas detector and information regarding the detection in association with each other.

8. The gas detection device according to claim 7, wherein the information regarding the detection includes information indicating whether or not a notification of the detection is to be given.

9. The gas detection device according to claim 8, wherein the information indicating whether or not a notification of the detection is to be given is an event that has caused the detection.

10. The gas detection device according to claim 7, wherein the information regarding detection of the gas is an image obtained by capturing an image of a monitoring target at a time of the detection.

11. The gas detection device according to claim 1, wherein the mask candidate region extractor uses a detected gas leakage position or a representative position of a detected gas region as a detection position by the gas detector.

12. The gas detection device according to claim 1, wherein
a notification by the gas detector includes a first notification issued for gas detection and a second notification issued for a frequency of gas detection, and
the mask data includes a first mask for suppressing the first notification and a second mask for suppressing the second notification.

13. The gas detection device according to claim 1, wherein the mask data includes a time-designated mask valid only at a predetermined time.

14. A gas detection method that gives a notification of a detected gas on a basis of a captured image obtained by capturing an image of a monitoring target, the gas detection method comprising:
detecting gas on a basis of the captured image and giving a notification of the detected gas;
receiving input information including first mask candidate region information from a user, the first mask candidate region information indicating a first mask candidate region that is a candidate region of a mask region for which a notification of gas detection is suppressed;
extracting a second mask candidate region that is a candidate region of a mask region for which a notification of gas detection is suppressed;
generating mask data indicating the mask region;
giving a notification of a gas detected outside the mask region in notification of the detected gas; and
in generation of the mask data,
determining a region in which the first mask candidate region for which the notification of gas detection is suppressed matches the second mask candidate region for which the notification of the gas detection is suppressed; and
generating the mask data based on the determined region.

15. A gas detection method that gives a notification of a detected gas on a basis of a captured image obtained by capturing an image of a monitoring target, the gas detection method comprising:
detecting gas on a basis of the captured image and giving a notification of the detected gas;
receiving input information including first mask candidate region information from a user, the first mask candidate region information indicating a first mask candidate region that is a candidate region of a mask region for which a notification of gas detection is suppressed;
extracting a second mask candidate region that is a candidate region of a mask region for which a notification of gas detection is suppressed;
generating mask data indicating the mask region;
giving a notification of a gas detected outside the mask region in notification of the detected gas, the mask region including a first region and a second region; and
generating a region set only by user designation included in the received input information as mask data of the first region in creation of the mask data, determining a region in which the first mask candidate region for which the notification of gas detection is suppressed matches the second mask candidate region for which the notification of the gas detection is suppressed, and generating the mask data of the second region based on the determined region.

16. A non-transitory recording medium storing a computer readable program causing a computer to perform gas detection processing that gives a notification of a detected gas on a basis of a captured image obtained by capturing an image of a monitoring target, the gas detection processing comprising:
   detecting gas on a basis of the captured image and giving a notification of the detected gas;
   receiving input information including first mask candidate region information from a user, the first mask candidate region information indicating a first mask candidate region that is a candidate region of a mask region for which a notification of gas detection is suppressed;
   extracting a second mask candidate region that is a candidate region of a mask region for which a notification of gas detection is suppressed;
   generating mask data indicating the mask region;
   giving a notification of a gas detected outside the mask region in notification of the detected gas; and
   in generation of the mask data,
      determining a region in which the first mask candidate region for which the notification of gas detection is suppressed matches the second mask candidate region for which the notification of the gas detection is suppressed; and
      generating the mask data based on the determined region.

17. A non-transitory recording medium storing a computer readable program causing a computer to perform gas detection processing that gives a notification of a detected gas on a basis of a captured image obtained by capturing an image of a monitoring target, the gas detection processing comprising:
   detecting gas on a basis of the captured image and giving a notification of the detected gas;
   receiving input information including first mask candidate region information from a user, the first mask candidate region information indicating a first mask candidate region that is a candidate region of a mask region for which a notification of gas detection is suppressed;
   extracting a second mask candidate region that is a candidate region of a mask region for which a notification of gas detection is suppressed;
   generating mask data indicating the mask region;
   giving a notification of a gas detected outside the mask region in notification of the detected gas, the mask region including a first region and a second region; and
   generating a region set only by user designation included in the received input information as mask data of the first region in creation of the mask data, determining a region in which the first mask candidate region for which the notification of gas detection is suppressed matches the second mask candidate region for which the notification of the gas detection is suppressed, and generating the mask data of the second region based on the determined region.

18. The gas detection device according to claim 2, wherein
   the mask candidate region extractor extracts the second mask candidate region using past detection information.

19. The gas detection device according to claim 2, wherein
   the mask candidate region extractor extracts the second mask candidate region by performing machine learning on past detection information and information input from the inputter as to whether or not to suppress notification of gas detection.

20. The gas detection device according to claim 2, wherein
   the mask generator generates the mask data for the second mask candidate region extracted by the mask candidate region extractor using a region matching a region input by a user as the mask region.

21. The gas detection device according to claim 2, wherein
   the mask generator generates the mask data for a region input by the inputter by a user using the second mask candidate region extracted by the mask candidate region extractor as the mask region.

22. The gas detection device according to claim 2, wherein
   the mask candidate region extractor holds a gas detection position by the gas detector and information regarding the detection in association with each other.

23. The gas detection device according to claim 2, wherein
   the mask candidate region extractor uses a detected gas leakage position or a representative position of a detected gas region as a detection position by the gas detector.

24. The gas detection device according to claim 2, wherein
   a notification by the gas detector includes a first notification issued for gas detection and a second notification issued for a frequency of gas detection, and
   the mask data includes a first mask for suppressing the first notification and a second mask for suppressing the second notification.

25. The gas detection device according to claim 2, wherein
   the mask data includes a time-designated mask valid only at a predetermined time.

* * * * *